(12) United States Patent
Abe et al.

(10) Patent No.: US 12,104,085 B2
(45) Date of Patent: Oct. 1, 2024

(54) OIL-WELL METAL PIPE, AND METHOD FOR PRODUCING OIL-WELL METAL PIPE

(71) Applicants: NIPPON STEEL CORPORATION, Tokyo (JP); VALLOUREC OIL AND GAS FRANCE, Aulnoye-Aymeries (FR)

(72) Inventors: Tomoka Abe, Tokyo (JP); Ken Tomiyasu, Tokyo (JP); Keishi Matsumoto, Tokyo (JP); Mamoru Ochiai, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 18/041,829

(22) PCT Filed: Aug. 16, 2021

(86) PCT No.: PCT/JP2021/029935
§ 371 (c)(1),
(2) Date: Feb. 16, 2023

(87) PCT Pub. No.: WO2022/039131
PCT Pub. Date: Feb. 24, 2022

(65) Prior Publication Data
US 2023/0312946 A1 Oct. 5, 2023

(30) Foreign Application Priority Data
Aug. 20, 2020 (JP) .................. 2020-139430

(51) Int. Cl.
*C09D 7/63* (2018.01)
*C10M 103/04* (2006.01)
(Continued)

(52) U.S. Cl.
CPC .............. *C09D 7/63* (2018.01); *C10M 103/04* (2013.01); *C10M 107/28* (2013.01);
(Continued)

(58) Field of Classification Search
CPC ...................... C10M 107/28; C10M 103/04; C10M 107/38; C10M 133/38; C10M 139/00;
(Continued)

(56) References Cited

U.S. PATENT DOCUMENTS 5,059,492 A * 10/1991 Shindou .................. C09D 5/08
428/623
2009/0236850 A1* 9/2009 Goto ....................... C23C 28/00
285/333
(Continued)

FOREIGN PATENT DOCUMENTS

| CN | 102329553 A | 1/2012 |
|---|---|---|
| JP | 2008527249 A | 7/2008 |

(Continued)

*Primary Examiner* — Vishal V Vasisth
(74) *Attorney, Agent, or Firm* — Greer, Burns & Crain, Ltd.

(57) ABSTRACT

An oil-well metal pipe according to the present disclosure has a pipe main body including a first end portion and a second end portion. The pipe main body includes a pin formed at the first end portion, and a box formed at the second end portion. The pin includes a pin contact surface including an external thread part, and the box includes a box contact surface including an internal thread part. The oil-well metal pipe according to the present disclosure also includes a resin coating containing a resin, a solid lubricant powder, and copper phthalocyanine on or above at least one of the pin contact surface and the box contact surface.

13 Claims, 11 Drawing Sheets

(51) Int. Cl.
    *C10M 107/28*     (2006.01)
    *C10M 107/30*     (2006.01)
    *C10M 107/38*     (2006.01)
    *C10M 139/00*     (2006.01)
    *C10N 10/04*     (2006.01)
    *C10N 30/12*     (2006.01)
    *C10N 40/02*     (2006.01)
    *F16L 15/04*     (2006.01)

(52) U.S. Cl.
    CPC ........ *C10M 107/30* (2013.01); *C10M 107/38* (2013.01); *C10M 139/00* (2013.01); *F16L 15/04* (2013.01); *C10M 2201/053* (2013.01); *C10M 2213/0623* (2013.01); *C10N 2010/04* (2013.01); *C10N 2030/12* (2013.01); *C10N 2040/02* (2013.01)

(58) Field of Classification Search
    CPC .......... C10M 107/30; C10M 2201/087; C10M 2201/053; C10M 2211/063; C10M 2209/1013; C10M 2201/042; C10M 2201/066; C10M 2209/0845; C10M 2219/042; C10M 2217/0453; C10M 2201/041; C10M 2209/1023; C10M 2201/062; C10M 2201/065; C10M 2213/0623; C10M 2217/0443; C10M 2209/1003; C10M 2201/103; C10M 2215/227; F16L 15/08; F16L 15/009; F16L 15/04; F16L 58/1072; F16L 15/001; C10N 2010/08; C10N 2010/04; C10N 2010/12; C10N 2030/12; C10N 2030/06; C10N 2080/00; C10N 2010/02; C10N 2030/00; C10N 2040/02; C10N 2010/10; C09D 7/63

See application file for complete search history.

(56) References Cited

U.S. PATENT DOCUMENTS

| | | |
|---|---|---|
| 2010/0210745 A1 | 8/2010 | McDaniel et al. |
| 2010/0233146 A1 | 9/2010 | McDaniel |
| 2011/0250626 A1 | 10/2011 | Williams et al. |
| 2014/0284919 A1 | 9/2014 | Goto et al. |
| 2015/0210888 A1 | 7/2015 | Goto |
| 2018/0274703 A1 | 9/2018 | Goto |
| 2020/0166163 A1 | 5/2020 | Goto |

FOREIGN PATENT DOCUMENTS

| | | |
|---|---|---|
| WO | 2006075774 A | 7/2006 |
| WO | 2009155115 A2 | 12/2009 |
| WO | 2014042144 A1 | 3/2014 |
| WO | 2017047722 A1 | 3/2017 |
| WO | 2018216416 A1 | 11/2018 |

\* cited by examiner

OIL-WELL METAL PIPE, AND METHOD FOR PRODUCING OIL-WELL METAL PIPE

CROSS-REFERENCES TO RELATED APPLICATIONS

This is a National Phase Application filed under 35 U.S.C. § 371, of International Application No. PCT/JP2021/029935, filed Aug. 16, 2021, which claimed priority to JP 2020-139430, filed Aug. 20, 2020, the contents of which are incorporated by reference.

TECHNICAL FIELD

The present disclosure relates to an oil-well metal pipe and method for producing an oil-well metal pipe.

BACKGROUND ART

An oil-well metal pipe is used for drilling in oil fields and natural gas fields (hereinafter, oil fields and natural gas fields are collectively referred to as "oil wells"). An oil-well metal pipe has a threaded connection. Specifically, at the oil well drilling site, a plurality of oil-well metal pipes are connected to form an oil country tubular goods connected body as typified by a casing pipe or a tubing pipe. An oil country tubular goods connected body is formed by fastening oil-well metal pipes to each other. Inspections are sometimes conducted on oil country tubular goods connected bodies. When conducting an inspection, the oil country tubular goods connected body is lifted up and loosened. Oil-well metal pipes are then detached from the oil country tubular goods connected body by loosening, and inspected. After the inspection, the oil-well metal pipes are refastened to each other, and the oil-well metal pipes are reused as a part of the oil country tubular goods connected body.

An oil-well metal pipe includes a pin and a box. The pin has a pin contact surface including an external thread part on an outer peripheral surface of an end portion of the oil-well metal pipe. The box has a box contact surface including an internal thread part on an inner peripheral surface of an end portion of the oil-well metal pipe. In the present description, the external thread part and the internal thread pan may also be collectively referred to as "thread parts". Note that, in some cases the pin contact surface may also include a pin unthreaded metal contact portion including a pin sealing surface and a pin shoulder surface. Likewise, in some cases the box contact surface may also include a box unthreaded metal contact portion including a box sealing surface and a box shoulder surface.

The pin contact surface and the box contact surface repeatedly experience strong friction during fastening and loosening of the oil-well metal pipe. Therefore, galling (unrepairable galling) is liable to occur at the pin contact surface and the box contact surface during repeated fastening and loosening. Accordingly, an oil-well metal pipe is required to have sufficient durability with respect to friction, that is, to have excellent galling resistance.

Heretofore, heavy metal powder-containing compound greases, which are referred to as "dopes", have been used to improve the galling resistance of an oil-well metal pipe. Application of a compound grease to the pin contact surface and/or the box contact surface can improve the galling resistance of an oil-well metal pipe. However, heavy metal powder contained in compound greases, such as Pb, Zn and Cu, may affect the environment. For this reason, the development of an oil-well metal pipe that is excellent in galling resistance even without the use of a compound grease is desired.

Technology for enhancing the galling resistance of an oil-well metal pipe is proposed in, for example, International Application Publication No. WO2014/042144 (Patent Literature 1) and International Application Publication No. WO2017/047722 (Patent Literature 2).

A composition disclosed in Patent Literature 1 is a composition for forming a solid coating on a surface of a threaded connection of an oil-well metal pipe. The composition contains, in a mixed solvent, including water and a dipolar aprotic solvent, a powdery organic resin which is at least partially soluble in the dipolar aprotic solvent. In the composition, the powdery organic resin is present in a dissolved state or a dispersed state in the mixed solvent.

A composition disclosed in Patent Literature 2 is a composition for forming a solid lubricant coating on a threaded connection of an oil-well metal pipe. The composition contains a binder, a lubricant addition agent, an anti-rust addition agent and a plasticizer.

CITATION LIST

Patent Literature

Patent Literature 1 International Application. Publication No. WO2014/042144

Patent Literature 2: International Application Publication No, WO2017/04722

SUMMARY OF INVENTION

Technical Problem

In this connection, various sizes (diameters) are used for an oil-well metal pipe. Therefore, it is desirable for it to be difficult for fastening together of oil-well metal pipes to become loose, irrespective of whether the size of the oil-well metal pipe is large or small. In this regard, a high fastening torque is set in advance for a large-diameter oil-well metal pipe so that oil-well metal pipes that were fastened do not become loose.

In the case of fastening large-diameter oil-well metal pipes with high torque, it is desirable that high torque performance is high. The phrase "high torque performance is high" means, in other words, that torque on shoulder resistance is large. The term "torque on shoulder resistance" means the difference between a yield torque at which one part of a threaded connection yields, and to shouldering torque at which interference between threaded connections rapidly increases. On the other hand, even when the technologies disclosed in Patent Literature 1 and Patent Literature 2 are used, in some cases the torque on shoulder resistance is small. In such a case, it is difficult to fasten large-diameter oil-well metal pipes with high torque.

An objective of the present disclosure is to provide an oil-well metal pipe that can be fastened with high torque even when the oil-well metal pipe has a large diameter, and a method for producing the oil-well metal pipe.

SOLUTION TO PROBLEM

An oil-well metal pipe according to the present disclosure includes:

a pipe main body including a first end portion and a second end portion, wherein:

the pipe main body includes:
a pin formed at the first end portion, and
a box formed at the second end portion;
the pin includes:
a pin contact surface including an external thread part; and
the box includes:
a box contact surface including an internal thread part;
the oil-well metal pipe further including;
a resin coating containing a resin, a solid lubricant powder and copper phthalocyanine on or above at least one of the pin contact surface and the box contact surface.

A method for producing the oil-well metal pipe according to the present disclosure includes the steps of;
preparing an oil-well metal pipe having a pipe main body that includes a pin including a pin contact surface that includes an external thread part, and a box including a box contact surface that includes an internal thread part;
applying a composition containing a resin, a solid lubricant powder and copper phthalocynine onto at least one of the pin contact surface and the box contact surface; and
hardening the composition that is applied to form a resin coating.

ADVANTAGEOUS EFFECTS OF INVENTION

The oil-well metal pipe according to the present disclosure can be fastened with high torque even when the oil-well metal pipe has a large diameter. The method for producing an oil-well metal pipe according to the present disclosure can produce the aforementioned oil-well metal pipe.

DESCRIPTION OF EMBODIMENTS

The present embodiment will be described in detail below with reference to the accompanying drawings. The same reference symbols will be used throughout the drawings to refer to the same or like parts, and description thereof will not be repeated.

The present inventors conducted various studies regarding, the relation between an oil-well metal pipe and fastening torque. As a result, the present inventors obtained the following findings.

High Torque Performance

Figure 1:
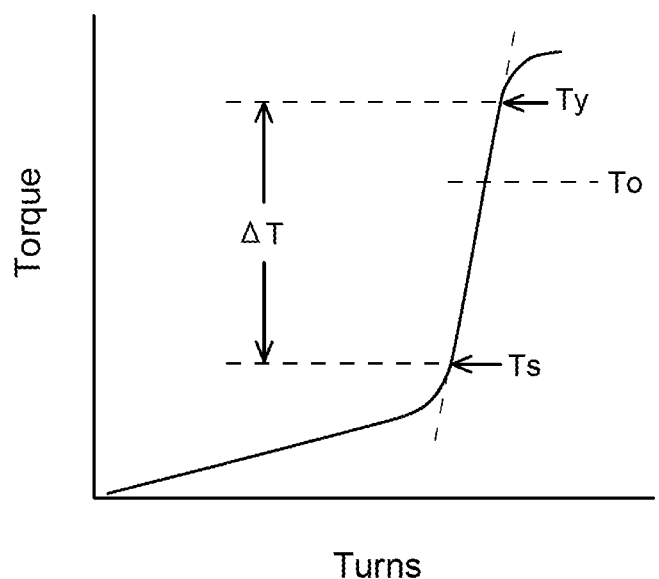
FIG. 1 is a graph illustrating the relation between the number of turns of an oil-well metal pipe that has a shoulder part and the torque, when the oil-well metal pipe is fastened.

When fastening oil-well metal pipes to each other, the optimal torque to end the listening is determined in advance. FIG. 1 is a graph illustrating the relation between the number of turns of an oil-well metal pipe that has a shoulder part and the torque, when the oil-well, metal pipe is fastened. Referring to FIG. 1, when oil-well metal pipes are fastened, initially the torque increases moderately in proportion to the number of turns. As fastening continues, the shoulder parts come in contact with each other. The torque at such time is referred to as "shouldering torque Ts". After the shouldering torque Ts is reached, when fastening is continued, the torque rapidly increases in proportion to the number of turns. The fastening is completed at a time point at which the torque reaches a predetermined value (fastening torque To). At the fastening torque To, metal seal portions interfere with each other with an appropriate interfacial pressure. In this case, high gas tightness is obtained with respect to the oil-well metal pipes. After reaching the fastening torque To, if the oil-well metal pipes are further fastened excessively, a torque will be reached a yield torque and a portion of the pin and the box will yield. In the present description, the difference between the shouldering torque Ts and the yield torque Ty is referred to as "torque on shoulder resistance ΔT".

Note that, as a different form of an oil-well metal pipe, an oil-well metal pipe which has a wedge thread and does not have a shoulder part is available. In the case of such kind of oil-well metal pipe that has a wedge thread also, similarly to an oil-well metal pipe that has a shoulder part, the relation between the number of turns of the oil-well metal pipe and the torque is as shown in FIG. 1.

Here, the term "wedge thread" means a thread having the following structure. At an external thread part of a wedge thread, in the direction in which screwing of the pin advances, the width of a thread ridge of an external thread part gradually narrows along the thread helix, the width of a thread groove of the external thread part gradually widens along the thread helix. And further, at an internal thread part of a wedge thread, in the direction in which screwing of the box advances, the width of a thread groove of an internal thread part gradually nut along the thread helix, and the width of a thread ridge of the internal thread part gradually widens along the thread helix. In the case of an oil-well metal pipe which has a wedge thread, as fastening progresses, the load flanks of the external thread part and the internal thread part come in contact with each other and stabbing flanks of the external thread part and the internal thread part come in coot Act with each other, and locking (interference fitting) occurs. The torque at the time that locking occurs is also referred to as "locking torque" or "locked flank torque".

In the present description, unless specifically stated otherwise, no distinction is made between locking torque and shouldering torque, and the term "shouldering torque Ts" is used to refer thereto. In the case of an oil-well metal pipe having a wedge thread also, similarly to an oil-well metal pipe having a shoulder part, after reaching the shouldering torque Ts, if fastening is continued further, the torque will rapidly increase in proportion to the number of turns. That is, at the shouldering torque Ts, the interference between the threaded connections increases rapidly. If fastening is continued further thereafter, the fastening torque To will be reached. After reaching the fastening torque To, if the oil-well metal pipes are further fastened excessively, the yield torque Ty will be reached and a portion of the pin and the box will yield.

As described above, a high fastening torque To is set for large-diameter oil-well metal pipes. However, in a case where the fastening torque To is set to a high value, in some cases, before the fastening torque To is reached, a portion of the pin and the box yields, and plastic deformation is caused. If the torque on shoulder resistance ΔT is large, fastening can be continued further after the shouldering torque Ts is reached. Therefore, if the torque on shoulder resistance ΔT is large, fastening with high torque can be performed even in the case of large-diameter oil-well metal pipes. In such a case, it is difficult for the oil-well metal pipes to become loose. In the present description, the term "high torque performance is high" means that the torque on shoulder resistance ΔT is large. In the present description, the term "large-diameter oil-well metal pipe" means an oil-well metal pipe having an external diameter of 254 mm (10 inches) or more.

To increase the torque on shoulder resistance ΔT, it is effective to decrease the shouldering torque Ts or to increase the yield torque Ty. However, it is known that, in general, the shouldering torque Ts and the yield torque Ty exhibit similar behavior. For example, in a case where the coefficient of friction of the surface of an oil-well metal pipe is lowered to decrease the shouldering torque Ts, the yield torque Ty also decreases, and not just the shouldering torque Ts. In this situation, in some cases a portion of the pin or the box yields before reaching the fastening torque To. Further, in a case where the coefficient of friction of the surface of an oil-well metal pipe is raised to increase the yield torque Ty, the shouldering torque is also increases, and not just the yield torque Ty. In this situation, in some cases shoulder parts may not come in contact with each other even when the fastening torque To is reached.

In comparison with normal- to small-diameter oil-well metal pipes; in the case of large-diameter oil-well metal pipes, there is also a demand to increase high torque performance. Therefore, the present inventors investigated methods that can increase high torque performance even in the case of a large-diameter oil-well metal pipe. As a result, the present inventors obtained the following findings.

Figure 2A:
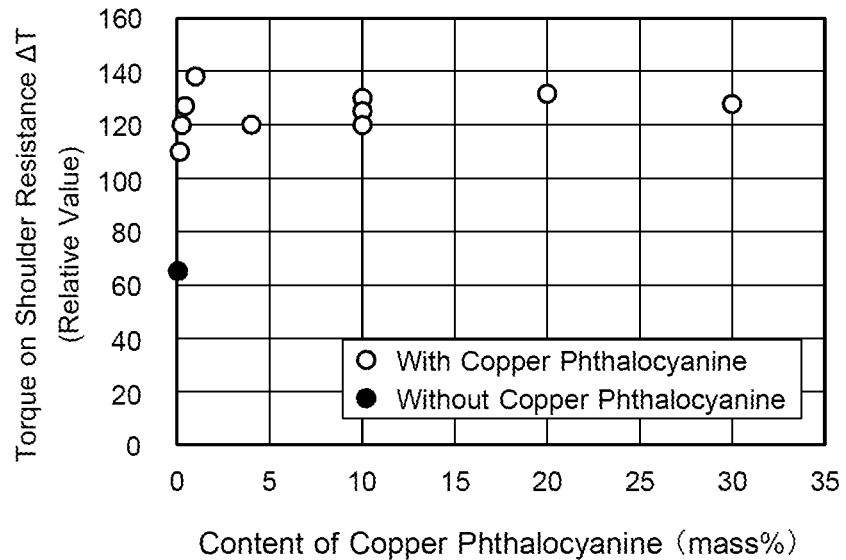
FIG. 2A is a graph illustrating the relation between the content of copper phthalocyanine in a resin coating and high torque performance.

FIG. 2A is a graph illustrating the relation between the content of copper phthalocyanine in a resin coating and high torque performance. The graph in FIG. 2A was obtained based on the results of Example 1 that is described later. In Example 1, a so-called "large-diameter oil-well metal pipe" (having an external diameter of 273.05 mm (10.75 inches) and a wall thickness of 12.570 mm (0.495 inches)) was used.

The abscissa in FIG. 2A represents the content (mass %) of copper phthalocyanine in a resin coating. The ordinate in FIG. 2A represents the torque on shoulder resistance ΔT. The torque on shoulder resistance ΔT was determined as a relative value in comparison to the torque on shoulder resistance ΔT in a case where a dope defined in API (American Petroleum Institute) standard BUL 5A2 (1998) was used and the value thereof was taken as 100. In FIG. 2A, the symbol of a white circle (○) denotes that copper phthalocyanine was contained in the resin coating, and the symbol of a black circle (●) denotes that copper phthalocyanine was not contained in the resin coating.

Referring to FIG. 2A, the torque on shoulder resistance ΔT increased when the resin coating contained copper phthalocyanine in comparison to a case where the resin coating did not contain copper phthalocyanine. That is, if the resin coating contains copper phthalocyanine, high torque performance increases. In this case, it is possible to perform fastening with high torque even when fastening large-diameter oil-well metal pipes.

Figure 2B:
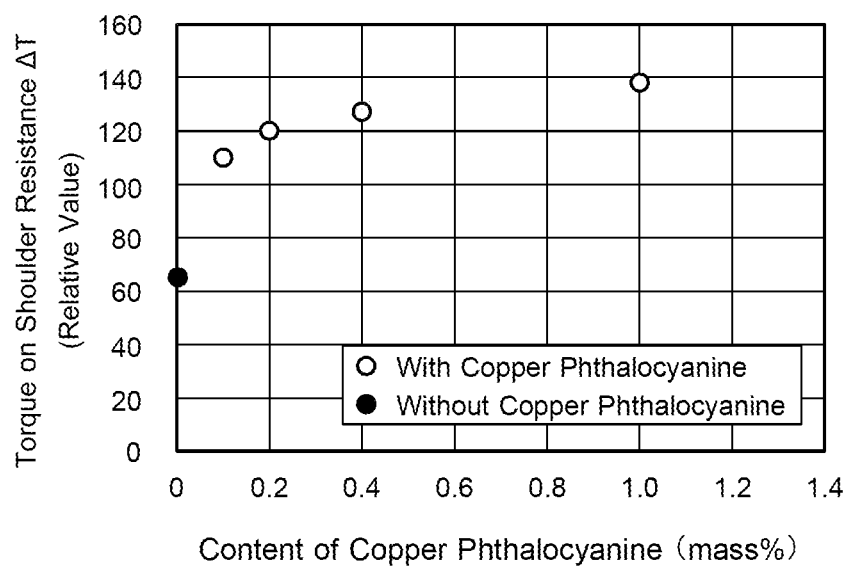
FIG. 2B is an enlarged view of a part of a graph illustrating, the relation between the content of copper phthalocyanine in a resin coating and high torque performance shown in FIG. 2A.

FIG. 2B, is an enlarged view of a part of a graph illustrating the relation between the content of copper phthalocyanine in a resin coating and high torque performance. Referring to FIG. 2B, if the content of copper phthalocyanine in the resin coating is adjusted to be 0.2 mass % or more, the high torque performance of the oil-well metal pipe increases further.

The gist of the oil-well metal pipe and the method for producing the oil-well metal pipe of the present embodiment that were completed based on the above findings is as follows.

[1]

An oil-well metal pipe, including:
a pipe main body including a first end portion and a second end portion, wherein:
the pipe main body includes:
a pin formed at the first end portion, and
a box formed at the second end portion;

the pin includes:
a pin contact surface including an external thread part; and
the box includes:
a box contact surface including an internal thread part;
the oil-well metal pipe further including:
a resin coating containing a resin, a solid lubricant powder and copper phthalocyanine on or above at least one of the pin contact surface and the box contact surface.

[2]
The oil-well metal pipe according to the present embodiment includes a resin coating that contains copper phthalocyanine. Therefore, even when the oil-well metal pipe has a large diameter, it is possible to perform fastening with high torque. Note that, the oil-well metal pipe according to the present embodiment is also applicable to a normal- to small-diameter oil-well metal pipe. Even in a case where the oil-well metal pipe according to the present embodiment is applied to a normal- to small-diameter oil-well metal pipe, fastening, at a necessary and sufficient torque is possible.

The oil-well metal pipe according to [1], wherein:
the resin coating contains 0.2 to 30.0 mass % of copper phthalocyanine.

In this case, the high torque performance of the oil-well metal pipe is further enhanced.

[3]
The oil-well metal pipe according to [2], wherein:
the resin coating contains:
0.2 to 30.0 mass % of copper phthalocyanine,
60 to 90 mass % of the resin, and
1 to 30 mass % of the solid lubricant powder.

[4]
The oil-well metal pipe according to [2] or [3], wherein:
the resin coating contains 0.2 to 9.0 mass % of copper phthalocyanine.

In this case, the galling resistance of the oil-well metal pipe increases, in addition to the high torque performance.

[5]
The oil-well metal pipe according to any one of [1] to [4], further including:
a plating layer between at least one of the pin contact surface and the box contact surface, and the resin coating.

[6]
The oil-well metal pipe according to any one of [1] to [4], further including:
a chemical conversion treatment layer between at least one of the pin contact surface and the box contact surface, and the resin coating.

[7]
The oil-well metal pipe according to [5], further including:
a chemical conversion treatment layer between the plating layer and the resin coating.

[8]
The oil-well metal pipe according to any one of [1] to [7], wherein:
the resin coating further containing a rust preventive pigment.

[9]
The oil-well metal pipe according to any one of [1] to [8], wherein:
at least one of the pin contact surface and the box contact surface is a surface that is subjected to one or more types of treatment selected from the group consisting of a blasting treatment and pickling.

[10]
The oil-well metal pipe according to any one of [1] to [9], wherein:
the resin is one or more types selected from the group consisting of epoxy resin, phenol resin, acrylic resin, urethane resin, polyester resin, polyamide-imide resin, polyamide resin, polyimide resin and polyether ether ketone resin.

[11]
The oil-well metal pipe according to any one of [1] to [10], wherein:
the solid lubricant powder is one or more types selected from the group consisting of graphite, zinc oxide, boron nitride, talc, molybdenum disulfide, tungsten disulfide, graphite fluoride, tin sulfide, bismuth sulfide, organic molybdenum, thiosulfate compounds, and polytetrafluoroethylene.

[12]
The oil-well metal pipe according to any one of [1] to [11], wherein:
the pin contact surface further includes a pin sealing surface and a pin shoulder surface, and
the box contact surface further includes a box sealing surface and a box shoulder surface.

[13]
A method for producing the oil-well metal pipe according to [1], the method including the steps of:
preparing an oil-well metal pipe having a pipe main body that includes a pin including a pin contact surface that includes an external thread part, and a box including a box contact surface that includes an internal thread part;
applying a composition containing a resin, a solid lubricant powder and copper phthalocyanine onto at least one of the pin contact surface and the box contact surface; and
hardening the composition that is applied to form a resin coating.

Hereunder, the oil-well metal pipe according to the present embodiment will be described in detail.

Structure of Oil-Well Metal Pipe

First, the structure of the oil-well metal pipe of the present embodiment will be described. The oil-well metal pipe has a well-known structure. The available types of oil-well metal pipes are a T&C type oil-well metal pipe and an integral type oil-well metal pipe. Hereunder, each type of oil-well metal pipe will be described in detail.

Case Where Oil-Well Metal Pipe 1 is T&C Type

Figure 3:
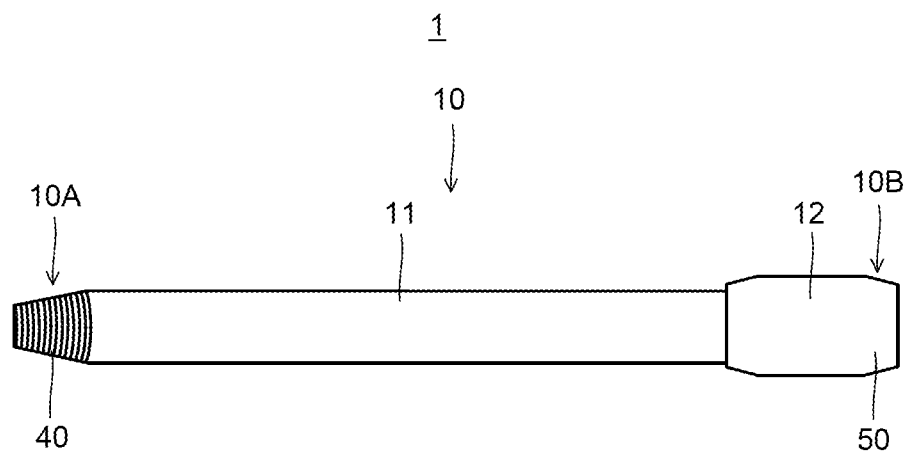
FIG. 3 is a configuration diagram illustrating one example of an oil-well metal pipe according to the present embodiment.

FIG. 3 is a configuration diagram illustrating one example of an oil-well metal pipe 1 according to the present embodiment. FIG. 3 is a configuration diagram illustrating the oil-well metal pipe 1 of a so-called T&C (threaded and coupled) type. Referring to FIG. 3, the oil-well metal pipe 1 includes a pipe main body 10.

The pipe main body 10 extends in the pipe axis direction. A cross section perpendicular to the pipe axis direction of the pipe main body 10 is a circular shape. The pipe main body 10 includes a first end portion 10A and a second end portion 10B. The first end portion 10A is an end portion on the opposite side to the second end portion 10B. In the T&C type oil-well metal pipe 1 illustrated in FIG. 3, the pipe main body 10 includes a pin tube body 11 and a coupling 12. The coupling 12 is attached to one end of the pin tube body 11.

More specifically, the coupling 12 is fastened by threading to one end of the pin tube body 11.

Figure 4:
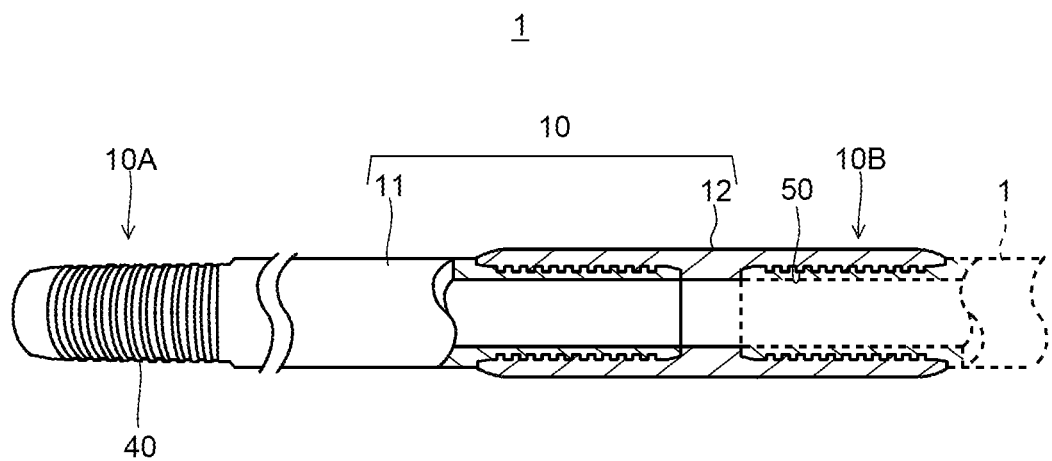
FIG. 4 is a partial cross-sectional view illustrating a cross section (longitudinal cross section) parallel to a pipe axis direction of a coupling of the oil-well metal pipe illustrated in FIG. 3.

FIG. 4 is a partial cross-sectional view illustrating a cross section (longitudinal cross section) that is parallel to the pipe axis direction of the coupling 12 of the oil-well metal pipe 1 illustrated in FIG. 3. Referring to FIG. 3 and FIG. 4, the pipe main body 10 includes a pin 40 and a box 50. The pin 40 is formed at the first end portion 10A of the pipe main body 10. When performing fastening, the pin 40 is inserted into the box 50 of another oil-well metal pipe 1 (not illustrated), and is fastened by threading to the box 50 of the other oil-well metal pipe 1.

The box 50 is formed at the second end portion 10B of the pipe main body 10. When performing fastening, the pin 40 of another oil-well metal pipe 1 is inserted into the box 50, and the box 50 is fastened by threading to the pin 40 of the other oil-well metal pipe 1.

Regarding Structure of Pin 40

Figure 5:
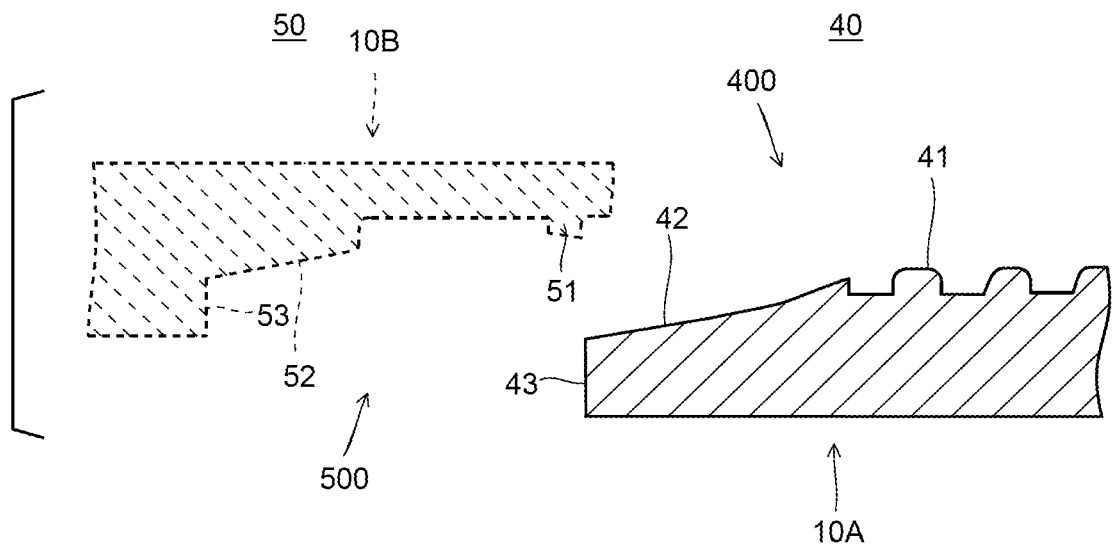
FIG. 5 is a cross-sectional view parallel to the pipe axis direction of the oil-well metal pipe illustrated in FIG. 4, that illustrates a portion in the vicinity of a pin of the oil-well metal pipe.

FIG. 5 is a cross-sectional view of a portion in the vicinity of the pin 40 of the oil-well metal pipe 1 illustrated in FIG. 4, that is a cross-sectional view parallel to the pipe axis direction of the oil-well metal pipe 1. A dashed line portion in FIG. 5 represents the structure of the box 50 of another oil-well metal pipe in the case of fastening the oil-well metal pipe 1 to another oil-well metal pipe 1. Referring to FIG. 5, the pin 40 includes a pin contact surface 400 on the outer peripheral surface of the first end portion 10A of the pipe main body 10. When fastening to the other oil-well metal pipe 1, the pin contact surface 400 is screwed into the box 50 of the other oil-well metal pipe 1 and contacts a box contact surface 500 (described later) of the box 50.

The pin contact surface 400 includes at least an external thread part 41 formed in the outer peripheral surface of the first end portion 10A. The pin contact surface 400 may further include a pin sealing surface 42 and a pin shoulder surface 43. In FIG. 5, the pin shoulder surface 43 is disposed at the front end face of the first end portion 10A, and on the outer peripheral surface of the first end portion 10A, the pin sealing surface 42 is disposed further on the front end side of the first end portion 10A than the external thread part 41. In other words, the pin sealing surface 42 is disposed between the external thread part 41 and the pin shoulder surface 43. The pin sealing surface 42 is provided in a tapered shape. Specifically, the external diameter of the pin sealing surface 42 gradually decreases from the external thread part 41 toward the pin shoulder surface 43 in the longitudinal direction (pipe axis direction) of the first end portion 10A.

When performing fastening with another oil-well metal pipe 1, the pin sealing surface 42 contacts a box sealing surface 52 (described later) of the box 50 of the other oil-well metal pipe 1. More specifically, during fastening, when the pin 40 is inserted into the box 50 of the other oil-well metal pipe 1, the pin sealing surface 42 contacts the box sealing surface 52. Subsequently, when the pin 40 is screwed further into the box 50 of the other oil-well metal pipe 1, the pin sealing surface 42 closely contacts the box sealing surface 52. By this means, during fastening, the pin sealing surface 42 closely contacts the box sealing surface 52 to thereby form a seal that is based on metal-to-metal contact. Therefore, the gas tightness can be increased in each of the oil-well metal pipe 1 that are fastened to each other.

In FIG. 5, the pin shoulder surface 43 is disposed at the front end face of the first end portion 10A. In other words, in the pin 40 illustrated in FIG. 5, the external thread part 41, the pin sealing surface 42 and the pin shoulder surface 43 are disposed sequentially in that order from the center of the pipe main body 10 toward the first end portion 10A. During fastening to the other oil-well metal pipe 1, the pin shoulder surface 43 opposes and contacts a box shoulder surface 53 (described later) of the box 50 of the other oil-well metal pipe 1. More specifically, during fastening, the pin shoulder surface 43 contacts the box shoulder surface 53 as a result of the pin 40 being inserted into the box 50 of the other oil-well metal pipe 1. By this means, during fastening, a high torque can be obtained. Further, the positional relation between the pin 40 and the box 50 in the fastening state can be stabilized.

Note that, the pin contact surface 400 of the pin 40 includes at least the external thread part 41. In other words, the pin contact surface 400 includes the external thread part 41, and need not include the pin sealing surface 42 and the pin shoulder surface 43. The pin contact surface 400 may include the external thread part 41 and the pin shoulder surface 43, and need not include the pin sealing surface 42. The pin contact surface 400 may include the external thread part 41 and the pin sealing surface 42, and need not include the pin shoulder surface 43.

Regarding Structure of Box 50

Figure 6:
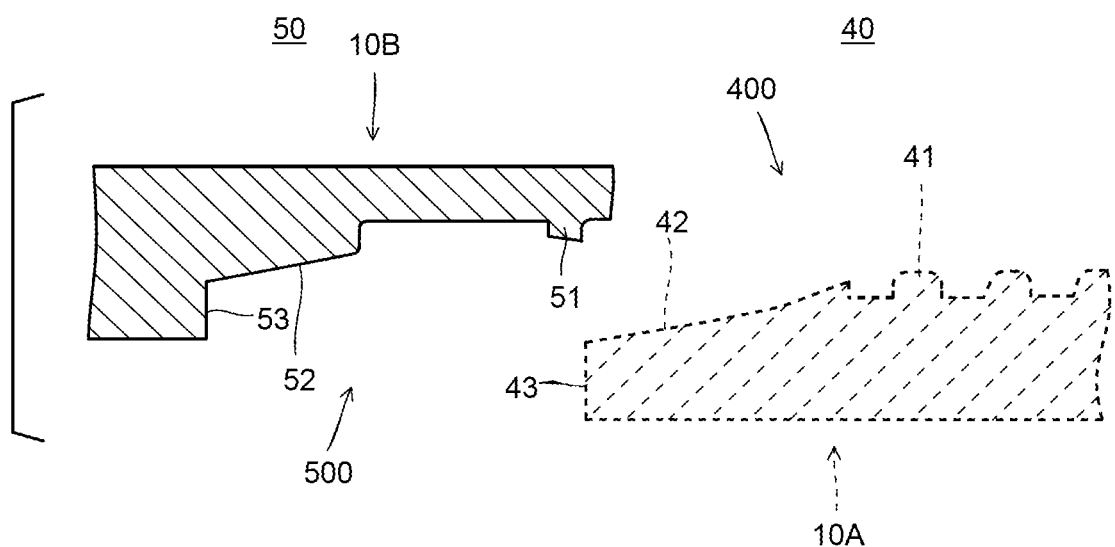
FIG. 6 is a cross-sectional view parallel to the pipe axis direction of the oil-well metal pipe illustrated in FIG. 4, that illustrates a portion in the vicinity of a box of the oil-well metal pipe.

FIG. 6 is a cross-sectional view of a portion in the vicinity of the box 50 of the oil-well metal pipe 1 illustrated in FIG. 4, that is a cross-sectional view parallel to the pipe axis direction of the oil-well metal pipe 1. A dashed line portion in FIG. 6 represents the structure of the pin 40 of another oil-well metal pipe 1 in the case of fastening the oil-well metal pipe 1 to another oil-well metal pipe 1. Referring to FIG. 6, the box 50 includes a box contact surface 500 on the inner peripheral surface of the second end portion 10B of the pipe main body 10. When performing fastening to another oil-well metal pipe 1, the box contact surface 500 contacts the pin contact surface 400 of the pin 40 of the other oil-well metal pipe 1 when the pin 40 is screwed into the box 50.

The box contact surface 500 includes at least an internal thread part 51 formed in the inner peripheral surface of the second end portion 10B. When performing fastening, the internal thread part 51 engages with the external thread part 41 of the pin 40 of the other oil-well metal pipe 1.

The box contact surface 500 may further include the box sealing surface 52 and the box shoulder surface 53. In FIG. 6, on the inner peripheral surface of the second end portion 10B, the box sealing surface 52 is disposed further on the pipe main body 10 side than the internal thread part 51. In other words, the box sealing surface 52 is disposed between the internal thread part 51 and the box shoulder surface 53. The box sealing surface 52 is provided in a tapered shape. Specifically, the internal diameter of the box sealing surface 52 gradually decreases from the internal thread part 51 toward the box shoulder surface 53 in the longitudinal direction (pipe axis direction) of the second end portion 10B.

When performing fastening to another oil-well metal pipe 1, the box sealing surface 52 contacts the pin sealing surface 42 of the pin 40 of the other oil-well metal pipe 1. More specifically, during fastening, when the pin 40 of the other oil-well metal pipe 1 is screwed into the box 50, the box sealing, surface 52 contacts the pin sealing surface 42, and when the pin 40 is screwed in further, the box sealing surface 52 closely contacts the pin sealing surface 42. By this means, during fastening, the box sealing surface 52 closely contacts the pin sealing surface 42 to thereby form a seal that is based on metal-to-metal contact. Therefore, the gas tightness can be increased in each of the oil-well metal pipe 1 that are fastened to each other.

The box shoulder surface 53 is disposed further on the pipe main body 10 side than the box sealing surface 52. In other words, in the box 50, the box shoulder surface 53, the box sealing surface 52 and the internal thread part 51 are disposed sequentially in that order from the center of the pipe main body 10 toward the front end of the second end portion 10B. When performing fastening to another oil-well metal pipe 1, the box shoulder surface 53 opposes and contacts the pin shoulder surface 43 of the pin 40 of the other oil-well metal pipe 1. More specifically, during fastening, the box shoulder surface 53 contacts the pin shoulder surface 43 as a result of the pin 40 of the other oil-well metal pipe 1 being inserted into the box 50. By this means, during fastening, a high torque can be obtained. Further, the positional relation between the pin 40 and the box 50 in the fastening state can be stabilized.

The box contact surface 500 includes at least the internal thread part 51. When performing fastening, the internal thread part 51 of the box contact surface 500 of the box 50 contacts the external thread part 41 of the pin contact surface 400 of the pin 40 in a manner such that the internal thread part 51 corresponds to the external thread part 41. The box sealing surface 52 contacts the pin sealing surface 42 in a manner such that the box sealing surface 52 corresponds to the pin sealing surface 42. The box shoulder surface 53 contacts the pin shoulder surface 43 in a manner such that the box shoulder surface 53 corresponds to the pin shoulder surface 43.

In a case where the pin contact surface 400 includes the external thread part 41 and does not include the pin sealing surface 42 and the pin shoulder surface 43, the box contact surface 500 includes the internal thread part 51 and does not include the box sealing surface 52 and the box shoulder surface 53. In a case where the pin contact surface 400 includes the external thread part 41 and the pin shoulder surface 43 and does not include the pin sealing surface 42, the box contact surface 500 includes the internal thread part 51 and the box shoulder surface 53 and does not include the box sealing surface 52. In a case where the pin contact surface 400 includes the external thread part 41 and the pin sealing surface 42 and does not include the pin shoulder surface 43, the box contact surface 500 includes the internal thread part 51 and the box sealing surface 52 and does not include the box shoulder surface 53.

The pin contact surface 400 may include a plurality of the external thread parts 41, may include a plurality of the pin sealing surfaces 42, and may include a plurality of the pin shoulder surfaces 43. For example, the pin shoulder surface 43, the pin sealing surface 42, the external thread part 41, the pin sealing, surface 42, the pin shoulder surface 43, the pin sealing surface 42 and the external thread part 41 may be disposed in that order on the pin contact surface 400 of the pin 40 in the direction from the front end of the first end portion 10A toward the center of the pipe main body 10. In such case, the internal thread part 51, the box sealing surface 52, the box shoulder surface 53, the box sealing surface 52, the internal thread part 51, the box sealing surface 52 and the box shoulder surface 53 are disposed in that order on the box contact surface 500 of the box 50 in the direction from the front end of the second end portion 10B toward the center of the pipe main body 10.

Figure 7:
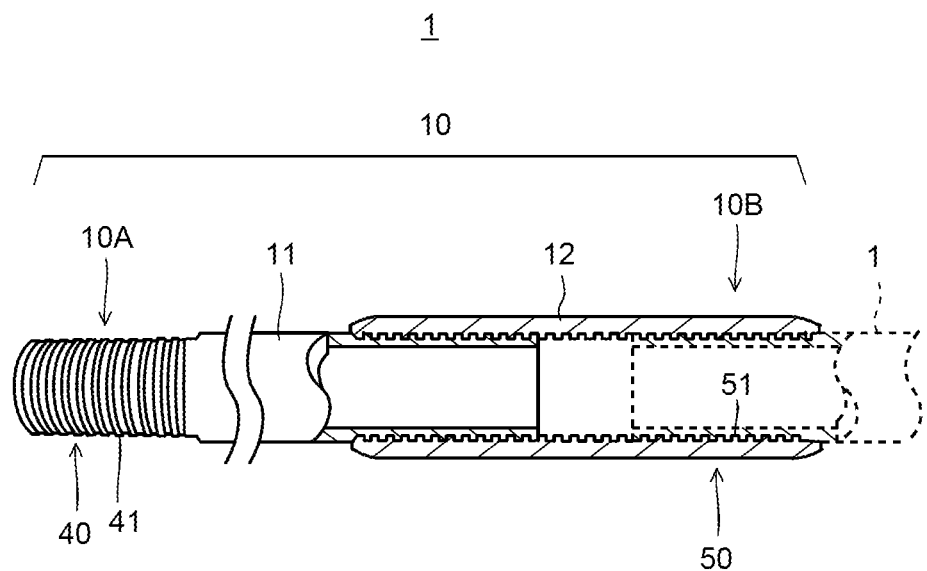
FIG. 7 is a partial cross-sectional view illustrating a cross section (longitudinal cross section) parallel to the pipe axis direction of a coupling of the oil-well metal pipe according to the present embodiment, that is different from FIG. 4.

In FIG. 5 and FIG. 6 a so-called "premium joint" is illustrated in which the pin 40 includes the external thread part 41, the pin sealing surface 42 and the pin shoulder surface 43, and the box 50 includes the internal thread part 51, the box sealing surface 52 and the box shoulder surface 53. However, as described above, the pin 40 may include the external thread part 41 and need not include the pin sealing surface 42 and the pin shoulder surface 43. In this case, the box 50 includes the internal thread part 51 and does not include the box sealing surface 52 and the box shoulder surface 53. FIG. 7 is a view illustrating one example of the oil-well metal pipe 1 in which the pin 40 includes the external thread part 41 and does not include the pin sealing surface 42 and the pin shoulder surface 43, and the box 50 includes the internal thread part 51 and does not include the box sealing surface 52 and the box shoulder surface 53.

Case Where Oil-Well Metal Pipe 1 is Integral Type

The oil-well metal pipe 1 illustrated in FIG. 3, FIG. 4 and FIG. 7 is a so-called "T&C type" oil-well metal pipe 1, in which the pipe main body 10 includes the pin tube body 11 and the coupling 12. However, the oil-well metal pipe 1 according to the present embodiment may be an integral type instead of a T&C type.

Figure 8:
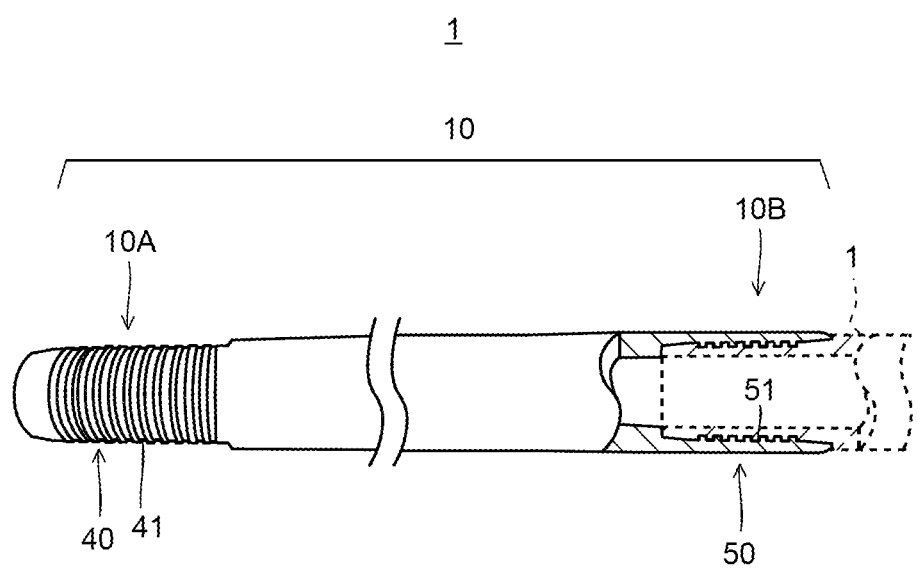
FIG. 8 is a configuration diagram illustrating an integral type oil-well metal pipe according to the present embodiment.

FIG. 8 is a configuration diagram of an integral type oil-well metal pipe 1 according to the present embodiment. Referring to FIG. 8, the integral type oil-well metal pipe 1 includes a pipe main body 10. The pipe main body 10 includes a first end portion 10A and a second end portion 10B. The first end portion 10A is disposed on the opposite side to the second end portion 10B. As described above, in the T&C type oil-well metal pipe 1, the pipe main body 10 includes the pin tube body 11 and the coupling 12. In other words, in the T&C type oil-well metal pipe 1, the pipe main body 10 is constituted by fastening two separate members (the pin tube body 11 and the coupling 12). In contrast, in the integral type oil-well metal pipe 1, the pipe main body 10 is formed in an integral manner.

The pin 40 is formed at the first end portion 10A of the pipe main body 10. When performing fastening, the pin 40 is inserted in and screwed into the box 50 of another integral type oil-well metal pipe 1, and thereby fastened to the box 50 of the other integral type oil-well metal pipe 1. The box 50 is formed at the second end portion 10B of the pipe main body 10. When performing fastening, the pin 40 of another integral type oil-well metal pipe 1 is inserted in and screwed into the box 50, to thereby fasten the box 50 to the pin 40 of the other integral type oil-well metal pipe 1.

The structure of the pin 40 of the integral type oil-well metal pipe 1 is the same as the structure of the pin 40 of the T&C type oil-well metal pipe 1 illustrated in FIG. 5. Similarly, the structure of the box 50 of the integral type oil-well metal pipe 1 is the same as the structure of the box 50 of the T&C type oil-well metal pipe 1 illustrated in FIG. 6. Note that, in FIG. 8, the pin shoulder surface 43, the pin sealing surface 42 and the external thread part 41 in the pin 40 are disposed in that order from the front end of the first end portion 10A toward the center of the pipe main body 10. Therefore, the internal thread part 51, the box sealing surface 52 and the box shoulder surface 53 in the box 50 are disposed in that order from the front end of the second end portion 10B toward the center of the pipe main body 10. However, similarly to the pin contact surface 400 of the pin 40 of the T&C type oil-well metal pipe 1, it suffices that the pin contact surface 400 of the pin 40 of the integral type oil-well metal pipe 1 includes at least the external thread part 41. Further, similarly to the box contact surface 500 of the box 50 of the T&C type oil-well metal pipe 1, it suffices that the box contact surface 500 of the box 50 of the integral type oil-well metal pipe 1 includes at least the internal thread part 51.

In short, the oil-well metal pipe 1 of the present embodiment may be a T&C type or may, be an integral type.

Resin Coating

Figure 9:
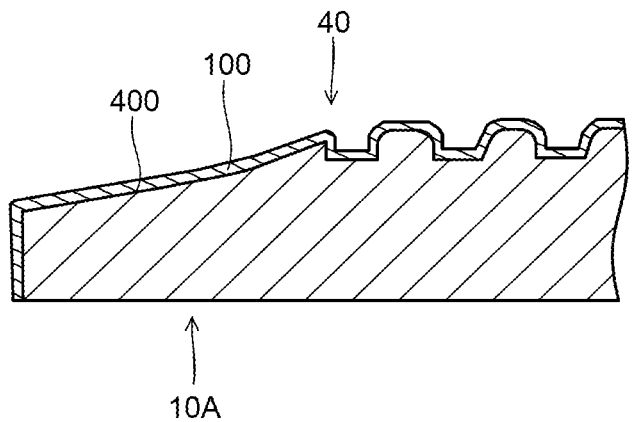
FIG. 9 is an enlarged view of a pin contact surface illustrated in FIG. 5.
Figure 10:
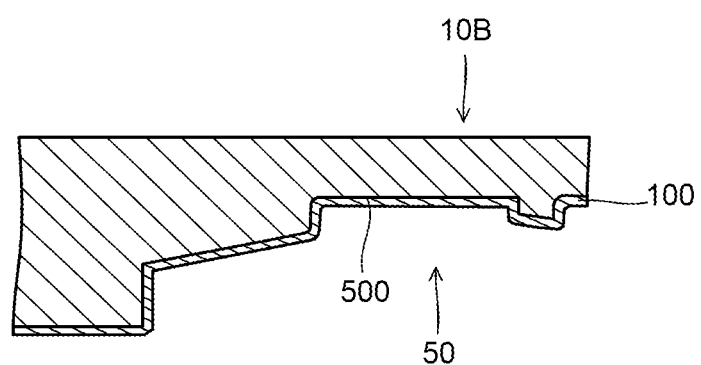
FIG. 10 is an enlarged view of a box contact surface illustrated in FIG. 6.

The oil-well metal pipe 1 according to the present embodiment includes a resin coating 100 on or above at least one of the pin contact surface 400 and the box contact surface 500. FIG. 9 is an enlarged view or the pin contact surface 400 illustrated in FIG. 5. FIG. 10 is an enlarged view of the box contact surface 500 illustrated in FIG. 6. As illustrated in FIG. 9 and FIG. 10, the oil-well metal pipe 1 according to the present embodiment may include the resin coating 100 on or above both the pin contact surface 400 and the box contact surface 500. However, a configuration may also be adopted in which the oil-well metal pipe 1 according to the present embodiment includes the resin coating 100 on or above only one surface among the pin contact surface 400 and the box contact surface 500. For example, in a case where the resin coating 100 is provided on or above the pin contact surface 400 as illustrated in FIG. 9, the resin coating 100 need not be provided on or above the box contact surface 500. Further, in a case where the resin coating 100 is provided on or above the box contact surface 500 as illustrated in FIG. 10, the resin coating need not be provided on the pin contact surface 400. In other words, the oil-well metal pipe 1 according to the present embodiment includes the resin coating 100 on the pin contact surface 400 and/or on or above the box contact surface 500.

The resin coating 100 is a solid coating that contains a resin, a solid lubricant powder, and copper phthalocyanine. The resin and the solid lubricant powder can each be independently selected. Hereunder, the resin, the solid lubricant powder, and the copper phthalocyanine contained in the resin coating 100 according to the present embodiment are described in detail.

Resin

The resin contained in the resin coating 100 according to the present embodiment is not particularly limited. However, when fastening the oil-well metal pipe 1, the surface of the resin coating 100 is scratched and abrasion powder is generated. Therefore, to stably obtain the wear resistance (coating life) of the resin coating 100 and high torque performance, it is preferable to use a resin for which the adhesion to the substrate is high and which has a moderate hardness. A resin for which the adhesion to the substrate is high and which has a moderate hardness is, for example, one or more types selected from the group consisting of epoxy resin, phenol resin, acrylic resin, urethane resin, polyester resin, polyamide-imide resin, polyimide resin, polyimide resin, and polyether ether ketone resin.

Preferably the resin is one type or two types selected from the group consisting of epoxy resin and acrylic resin.

The content of the resin in the resin coating 100 is, for example, 60 to 90 mass %. In this case, the formability, galling resistance and high torque performance of the resin coating 100 can be more stably increased. The lower limit of the content of resin is preferably 62 mass %, more preferably is 63 mass %, and further preferably is 65 mass %. The upper limit of the content of resin is preferably 88 mass %, and more preferably is 86 mass %.

Solid Lubricant Powder

The solid lubricant powder contained in the resin coating 100 according to the present embodiment is not particularly limited. The solid lubricant powder is, for example, one or more types selected from the group consisting of graphite, zinc oxide, boron nitride, talc, molybdenum disulfide, tungsten disulfide, graphite fluoride, tin sulfide, bismuth sulfide organic molybdenum, thiosulfate compounds, and polytetrafluoroethylene.

Preferably the solid lubricant powder is one or more types selected from the group consisting of graphite, polytetrafluoroethylene, and molybdenum disulfide. Further preferably, the solid lubricant powder is polytetrafluoroethylene.

The content of the solid lubricant powder in the resin coating 100 is, for example, 1 to 30 mass %. In this case, the formability and galling resistance of the resin coating 100 can be more stably enhanced. The lower limit of the content of the solid lubricant powder is preferably 2 mass %, and more preferably is 5 mass %. The upper limit of the content of the solid lubricant powder is preferably 25 mass %, and more preferably is 20 mass %.

Copper Phthalocyanine

The resin coating 100 according to the present embodiment contains copper phthalocyanine. In the oil-well metal pipe 1 according to the present embodiment, copper phthalocyanine is the most important substance for exerting high torque performance. Copper phthalocyanine is one type of phthalocyanine complex in which phthalocyanine ($C_{32}H_{18}N_8$) has coordinated with copper ions ($Cu^{2+}$). The chemical formula of copper phthalocyanine is shown below.

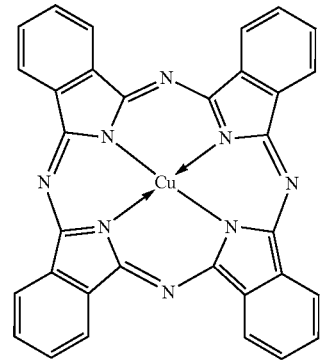

If copper phthalocyanine is contained in the resin coating 100, the high torque performance of the oil-well metal pipe 1 increases. The details regarding the reason the high torque performance increases have not been clarified. However, it has been verified by examples that are described later that, as a result of copper phthalocyanine being contained in the resin coating 100 according to the present embodiment, the torque on shoulder resistance ΔT that is the difference between the yield torque Ty and the shouldering torque Ts increases. Therefore, even when the oil-well metal pipe 1 according to the present embodiment has a large diameter, the oil-well metal pipe 1 can be fastened with high torque.

The content of copper phthalocyanine in the resin coating 100 according to the present embodiment is not particularly limited. That is, even when a small amount of copper phthalocyanine is contained in the resin coating 100, an effect of enhancing the high torque performance of the oil-well metal pipe 1 is obtained to a certain extent. The lower limit of the content of copper phthalocyanine in the resin coating 100 may be 0.1 mass %. On the other hand, if the content of copper phthalocyanine in the resin coating 100 is 0.2 mass % or more, the high torque performance of the oil-well metal pipe 1 is further enhanced. Accordingly, in the present embodiment, the lower limit of the content of copper phthalocyanine in the resin coating 100 is preferably 0.1 mass %, more preferably is 0.2 mass %, and further preferably is 0.4 mass %.

If the content of copper phthalocyanine in the resin coating 100 according to the present embodiment is 30.0 mass % or less, the dispersibility of the copper phthalocyanine increases. Accordingly, a preferable upper limit of the content of copper phthalocyanine in the resin coating 100 is 30.0 mass %. In addition, if the content of copper phthalocyanine in the resin coating 100 according to the present embodiment is 9.0 mass % or less, the galling resistance of the oil-well metal pipe 1 also increases, and not just the high torque performance. Therefore, the upper limit of the content of copper phthalocyanine in the resin coating 100 may be 9.0 mass %.

Thus, the upper limit of the content of copper phthalocyanine in the resin coating 100 according to the present embodiment is preferably 30.0 mass %, more preferably is 14.0 mass %, further preferably is 12.0 mass %, further preferably is 10.0 mass %, further preferably is 9.0 mass %, and further preferably is 6.0 mass %.

Galling Resistance

In the oil-well metal pipe 1 according to the present embodiment, if the upper limit of the content of copper phthalocyanine in the resin coating 100 is adjusted further, the galling resistance of the oil-well metal pipe 1 also increases, and not just the high torque performance. Hereunder, the content will be described more specifically with reference to a table.

Table 1 shows the contents of copper phthalocyanine in resin coatings 100 and results of the Bowden test as an index of galling resistance. Table 1 was obtained by extracting, some of the results of Example 2 that is described later. In Example 2, a resin coating 100 containing the copper phthalocyanine content shown in Table 1 was formed on the surface of a steel plate of each of the test numbers. The Bowden test was conducted using the steel plates of the respective test numbers on which a resin coating 100 was formed. In the Bowden test, a steel ball was caused to slide on the surface of the resin coating 100 of the steel plate of each test number, and the coefficient of friction was determined. The content of copper phthalocyanine in the resin coating 100 and the number of sliding times until the coefficient of friction became more than 0.3 of each Test Numbers are shown in Table 1. Note that, a higher value for the number of sliding times until the coefficient of friction became more than 0.3 indicates a higher galling resistance.

TABLE 1

| Test Number | Copper Phthalocyanine Content | Number of Sliding Times until Coefficient of Friction Became More Than 0.3 (Times) |
|---|---|---|
| 13 | 0.1 mass % | 510 |
| 14 | 0.5 mass % | 647 |
| 15 | 2.0 mass % | 524 |
| 16 | 5.0 mass % | 531 |

TABLE 1-continued

| Test Number | Copper Phthalocyanine Content | Number of Sliding Times until Coefficient of Friction Became More Than 0.3 (Times) |
|---|---|---|
| 17 | 10.0 mass % | 55 |
| 21 | — | 511 |

Referring to Table 1, if the content of copper phthalocyanine in the resin coating 100 is 0.2 to 9.0 mass %, the number of sliding times until the coefficient of friction becomes more than 0.3 increases in comparison to a case where the content of copper phthalocyanine in the resin coating 100 is 0.1 mass % or 10.0 mass %. That is, if the content of copper phthalocyanine in the resin coating 100 is 0.2 to 9.0 mass %, the galling resistance of the oil-well metal pipe 1 increases, and not only the high torque performance.

Other Components

The resin coating 100 according to the present embodiment may also contain components other than the components described above. The other components are, for example, one or more types selected from the group consisting of rust preventive agent, an antiseptic agent and an antioxidant agent. The rust preventive agent is, for example, one or more types selected from the group consisting of aluminum tripolyphosphate, aluminum phosphite and calcium ion-exchanged silica. A commercially available water repellent agent may be employed as the rust preventive agent.

The resin coating 100 according to the present embodiment may be formed of a sing k layer or may include multiple layers. The term "include multiple layers" refers to as state in which the resin coating 100 is deposited in two layers or more in the radial direction of the oil-well metal pipe 1. The resin coating 100 can be deposited and formed in two layers or more by repeating application and hardening of the composition for forming the resin coating 100. The resin coating 100 may be directly formed on at least one of the pin contact surface 400 and the box contact surface 500, or may be formed after subjecting the pin contact surface 400 and/or the box contact surface 500 to a preconditioning treatment described later. In a case where the resin coating 100 includes multiple layers, any one layer among the multiple layers of the resin coating 100 may contain the respective components within the aforementioned ranges, or all of the multiple layers of the resin coating 100 may contain the respective components within the aforementioned ranges. Preferably, the resin coating 100 includes an anti-rust resin coating. In the present embodiment, the anti-rust resin coating is an optional component. That is, in the oil-well metal pipe 1 according to the present embodiment, the anti-rust resin coating may not be formed. Hereunder, the anti-rust resin coating will be described.

Anti-Rust Resin Coating

The oil-well metal pipe 1 according to the present embodiment may include an anti-rust resin coating in the resin coating 100 formed on or above at least one of the pin contact surface 400 and the box contact surface 500. The anti-rust resin coating contains a rust preventive pigment and an acrylic silicon resin. The rust preventive pigment is, for example, one or more types selected from the group consisting of aluminum tripolyphosphate, aluminum phosphite, a zinc rich primer (JIS K5552 (2010)), and micaceous iron oxide. A commercially available acrylic silicon resin can be employed as the acrylic silicon resin. The commercially available acrylic silicon resin is, for example, an acrylic, silicon resin with the trade name "ACRYDIC" manufactured by DIC Corporation. When the resin coating 100 of the oil-well metal pipe 1 includes the anti-rust resin coating 70, the corrosion resistance of the oil-well metal pipe 1 increases.

The content of the rust preventive pigment in the anti-rust resin coating is, for example, 5 to 30 mass %. The content of the acrylic silicon resin in the anti-rust resin coating is, for example, 50 to 80 mass %. The anti-rust resin coating may contain other components in addition to the rust preventive pigment and the acrylic silicon resin. Examples of the other components include one or more types selected the group consisting of a pigment, an antifoaming agent, a leveling agent, and a fibrous filler. The content of the other components in the anti-rust resin coating is for example, 0 to 20 mass % in total.

Figure 11:
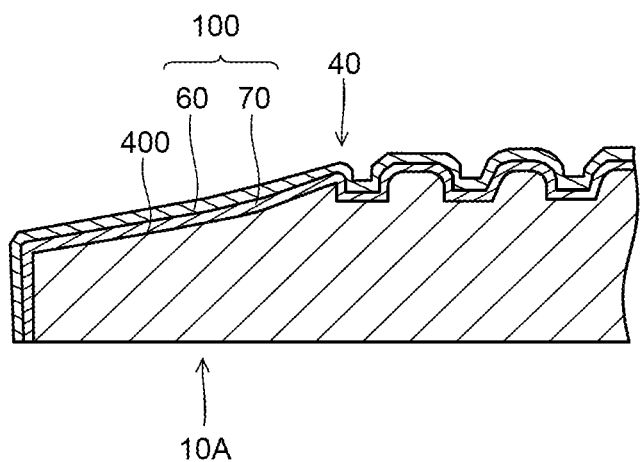
FIG. 11 is an enlarged view of a pin contact surface according to the present embodiment, that is different from FIG. 9.

As mentioned above, an anti-rust resin coating is included in the resin coating 100. Specifically, FIG. 11 is an enlarged view of the pin contact surface 400 according to the present embodiment, that is different from FIG. 9. Referring to FIG. 11, the oil-well metal pipe 1 includes the anti-rust resin coating 70 and an upper layer 60 of the resin coating 100 in the resin coating 100 formed on or above the pin contact surface 400. In this case, the upper layer 60 of the resin coating 100 contains a resin, a solid lubricant powder, and copper phthalocyanine, and the anti-rust resin coating 70, as a lower layer of the resin coating 100, contains a rust preventive pigment and an acrylic silicon resin.

In the oil-well metal pipe 1 according to the present embodiment, the location at which the anti-rust resin coating 70 is provided is not limited to the location in the example illustrated in FIG. 11. Although not illustrated in the drawings, similar with illustrated in FIG. 11, the oil-well metal pipe 1 may include the anti-rust resin coating 70 in the resin coating 100 formed on or above the box contact surface 500. Also, the anti-rust resin coating 70 may be included only in the resin coating 100 formed on or above the pin contact surface 400, and may not be included in the resin coating 100 formed on or above the box contact surface 500. Further, the anti-rust resin coating 70 may not be included in the resin coating 100 formed on or above the pin contact surface 400, and may be included only in the resin coating 100 formed on or above the box contact surface 500. Furthermore, the anti-rust resin coating 70 may be included in both the resin coating 100 formed on or above the pin contact surface 400 and the resin coating 100 formed on or those the box contact surface 500.

In the present embodiment, the anti-rust resin coating 70 may be included in the resin coating 100 formed on the plating layer that is described later, or may be included in the resin coating 100 formed on the chemical conversion treatment layer that is described later. That is, in the present embodiment, the anti-rust resin coating 70 may be formed on the pin contact surface 400, may be formed on the box contact surface 500, may be formed on the plating layer that is described later, or may be formed on the chemical conversion treatment layer that is described later.

The resin coating 100 may be formed as the outermost layer on the pin contact surface 400 and/or the box contact surface 500. During fastening of the oil-well metal pipe 1, a liquid lubricant may further be applied onto the resin coating 100.

Thickness of Resin Coating

The thickness of the resin coating 100 is not particularly limited. The thickness of the resin coating 100 is, for example, 1 to 100 μm. In this case, the high torque performance of the oil-well metal pipe 1 can be more stably increased. The lower limit of the thickness of the resin coating 100 is preferably 2 μm, more preferably is 5 μm, and further preferably is 10 μm. The upper limit of the thickness of the resin coating 100 is preferably 80 μm more preferably is 70 μm, further preferably is 60 μm, and further preferably is 50 μm.

Method for Measuring Resin Coating

The thickness of the resin coating 100 is measured by the following method. A probe of an electromagnetic induction type film thickness measuring instrument is brought into contact with the pin contact surface 400 or the box contact surface 500 on which the resin coating 100 is formed. The probe has an electromagnet, and when a magnetic body is brought close to it, electromagnetic induction occurs, and its voltage changes depending on the distance between the probe and the magnetic body. The thickness of the resin coating 100 is determined from the change in voltage amount. The measurement locations are twelve locations (twelve locations that are at 0°, 30°, 60°, 90°, 120°, 150°, 180°, 210°, 240°, 270°, 300° and 330°) in the tube circumferential direction of the oil-well metal pipe 1. The arithmetic mean of the measurement results of the twelve locations is taken to be the thickness of the resin coating 100.

The resin coating 100 may be formed on the pin contact surface 400 or the box contact surface 500, in direct contact with the pin contact surface 400 or the box contact surface 500. The oil-well metal pipe 1 may also include another coating between the pin contact surface 400 or the box contact surface 500, and the resin coating 100. The other coating is, for example, one or more types of coating selected from the group consisting of a plating layer and a chemical conversion treatment layer.

Optional Component

Plating Layer

The oil-well metal pipe 1 according to the present embodiment may include a plating layer between at least one of the pin contact surface 400 and the box contact surface 500, and the resin coating 100. In the oil-well metal pipe 1 according to the present embodiment, the plating layer is an optional component. Therefore, in the oil-well metal pipe 1 according to the present embodiment, the plating layer may not be formed.

Figure 12:
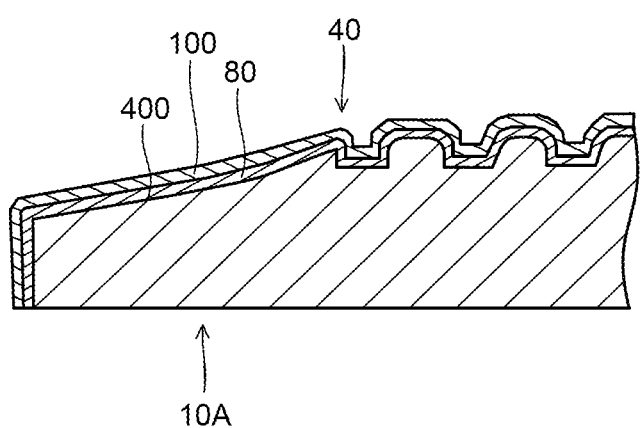
FIG. 12 is an enlarged view of a pin contact suffice according to the present embodiment, that is different from FIG. 9 and FIG. 11.

FIG. 12 is an enlarged view of the pin contact surface 400 according to the present embodiment, that is different from FIG. 9 and FIG. 11. In FIG. 12, a plating layer 80 is provided between the pin contact surface 400 and the resin coating 100. Specifically, in FIG. 12, the plating layer 80 is formed on the pin contact surface 400, and the resin coating 100 is formed on the plating layer 80. However, a location at which the plating layer 80 is provided is not limited to the location illustrated in FIG. 12. Although not illustrated in the drawings, for example, the plating layer 80 may be provided between the box contact surface 500 and the resin coating 100. For example, the plating layer 80 may be provided between the pin contact surface 400 and the resin coating 100, and neither the resin coating 100 nor the plating layer 80 need be provided on the box contact surface 500. For example, the plating layer 80 may be provided between the pin contact surface 400 and the resin coating 100, and the plating layer 80 may also be provided between the box contact surface 500 and the resin coating 100.

Figure 13:
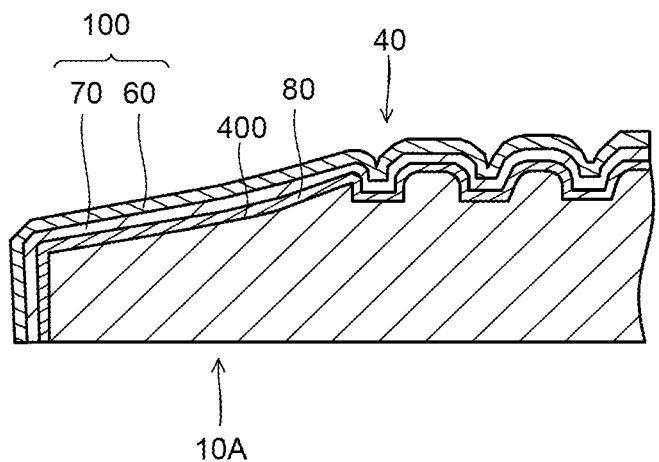
FIG. 13 is an enlarged view of a pin contact surface according to the present embodiment, that is different from FIG. 9, FIG. 11 and FIG. 12.

In the present embodiment, the anti-rust resin coating 70 is formed on the plating layer 80. FIG. 13 is an enlarged view of the pin contact surface 400 according to the present embodiment, that is different from FIG. 9, FIG. 11 and FIG. 12. Referring to FIG. 13, a plating layer 80 may be provided between the pin contact surface 400 and the resin coating 100, and further, the anti-rust resin coating 70 and the upper layer 60 of the resin coating 100 may be included in the resin coating 100.

In the present embodiment, the kind of the plating layer 80 is not particularly limited. The plating layer 80, for example, is selected from the group consisting of a Zn plating layer, an Ni plating layer, a Cu plating layer, a Zn—Ni alloy plating layer, a Zn—Co alloy plating layer, and a Ni—W alloy plating layer. In a case where the plating layer 80 is a Zn—Ni alloy plating layer, the chemical composition of the Zn—Ni alloy plating layer consists of, for example, 10 to 20 mass % of Ni, with the balance being Zn and impurities. In a case where the plating layer 80 is a Cu plating layer, the chemical composition of the Cu plating layer consists of, for example, Cu and impurities.

In a case where the oil-well metal pipe 1 according to the present embodiment includes the plating layer 80 on the pin contact surface 400 and/or the box contact surface 500, the galling resistance of the oil-well metal pipe 1 is further enhanced.

Figure 14:
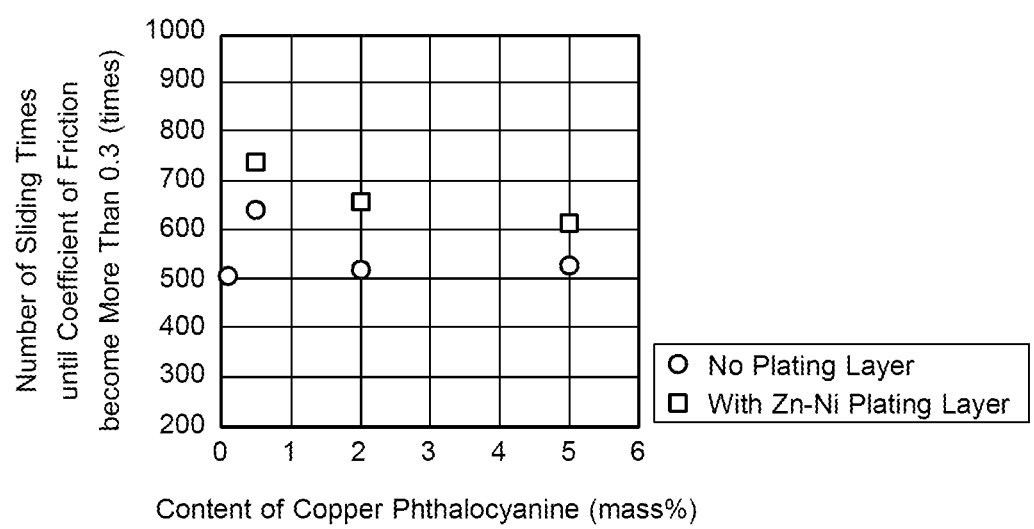
FIG. 14 is a graph illustrating the relation between a plating layer and results of the Bowden test as an index of galling resistance.

FIG. 14 is a graph illustrating the relation between the plating layer 80, the content of copper phthalocyanine, and results of the Bowden test as an index of galling resistance. The graph in FIG. 14 was obtained based on Example 2 that is described later. The abscissa in FIG. 14 represents the content of copper phthalocyanine in the resin coating 100. The ordinate in FIG. 14 represents the number of sliding times until the coefficient of friction becomes more than 0.3. In Example 2, a steel ball was caused to slide on the surface of a steel plate on which the plating layer 80 and/or the resin coating 100 was formed, and the number of sliding times until the coefficient of friction became more than 0.3 was measured. A higher the value for the number of sliding times until the coefficient of friction became more than 0.3 indicates a higher galling resistance. In FIG. 14, the symbol of a white circle (○) denotes that only the resin coating 100 was formed on the steel plate surface, and the plating layer 80 was not formed thereon. In FIG. 14, the symbol of a square (□) denotes that a alloy plating layer was formed on the steel plate surface, and the resin coating 100 was formed thereon. Referring to FIG. 14, for the oil-well metal pipe 1 that included the Zn—Ni alloy plating layer, the number of sliding times until the coefficient of friction became more than 0.3 is large in comparison to the oil-well metal pipe 1 that did not include the plating layer 80. Thus, the galling resistance of the oil-well metal pipe 1 in which the plating layer 80 is formed on the pin contact surface 400 and/or the box contact surface 500 is further enhanced.

Thickness of Plating Layer

The thickness of the plating layer 80 is not particularly limited. The thickness of the plating layer 80 is, for example, 1 to 30 μm. In this case, the galling resistance of the oil-well metal pipe 1 can be more stably enhanced. The lower limit of the thickness of the plating layer 80 is preferably 2 μm, more preferably is 3 μm, and further preferably is 4 μm. The upper limit of the thickness of the plating layer 80 is preferably 20 μm, and more preferably is 10 μm.

Method for Measuring Thickness of Plating Layer

The thickness of the plating layer 80 is measured by the following method. A probe of an electromagnetic induction type film thickness measuring instrument is brought into contact with the pin contact surface 400 or the box contact surface 500 on which the plating layer 80 is formed. The probe is brought into contact with the pin contact surface 400 or the box contact surface 500 at a portion where the resin coating 100 is removed. The probe has an electromagnet, and when a magnetic body is brought close to it, electromagnetic induction occurs, and its voltage changes depending on the distance between the probe and the magnetic body. The thickness of the plating layer 80 is determined from the change in voltage amount. The measurement locations are twelve locations (twelve locations that are at 0°, 30°, 60°, 90°, 120°, 150°, 180°, 210°, 240°, 270°, 300° and 330°) in the tube circumferential direction of the oil-well metal pipe 1. The arithmetic mean of the measurement results of the twelve locations is taken to be the thickness of the plating layer 80.

Chemical Conversion Treatment Layer

The oil-well metal pipe 1 according to the present embodiment may further include a chemical conversion treatment layer between at least one of the pin contact surface 400 and the box contact surface 500, and the resin coating 100. In the oil-well metal pipe 1 according to the present embodiment, the chemical conversion treatment layer is an optional component. That is, in the oil-well metal pipe 1 according to the present embodiment, the chemical conversion treatment layer may not be formed.

Figure 15:
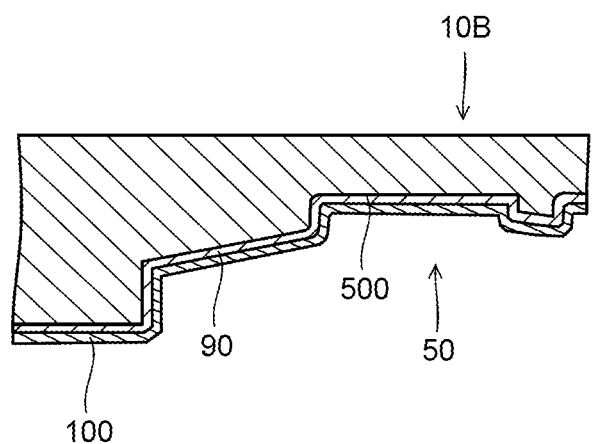
FIG. 15 is an enlarged view of a box contact surface according to the present embodiment, that is different from FIG. 10.

FIG. 15 is an enlarged view of the box contact surface 500 according to the present embodiment, that is different from FIG. 10. In FIG. 15, a chemical conversion treatment layer 90 is provided between the box contact surface 500 and the resin coating 100. Specifically, in FIG. 15, the chemical conversion treatment layer 90 is formed on the box contact surface 500, and the resin coating 100 is formed on the chemical conversion treatment layer 90. However, a location at which the chemical conversion treatment layer 90 is provided is not limited to the location illustrated in FIG. 15. Although not illustrated in the drawings, for example, the chemical conversion treatment layer 90 may be provided between the pin contact surface 400 and the resin coating 100, and neither the resin coating 100 nor the chemical conversion treatment layer 90 need be provided on the box contact surface 500. For example, the chemical conversion treatment layer 90 may be provided between the pin contact surface 400 and the resin coating 100, and the chemical conversion treatment layer 90 may also be provided between the box contact surface 500 and the resin coating 100.

Figure 16:
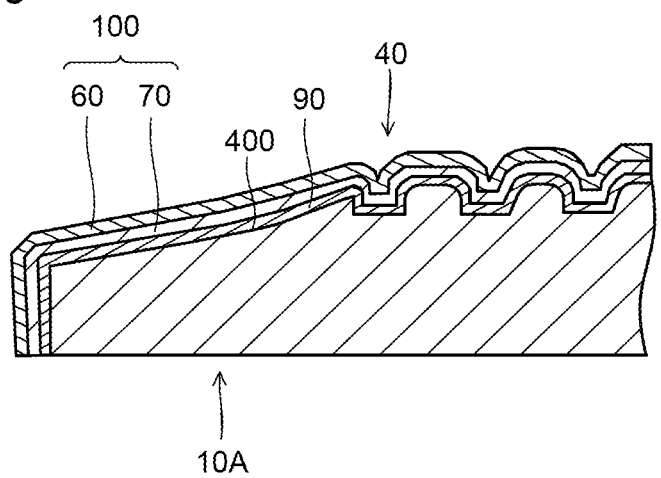
FIG. 16 is an enlarged view of a pin contact surface according to the present embodiment, that is different from FIG. 9, FIG. 11, FIG. 12 and FIG. 13.

Further, in the present embodiment, the anti-rust resin coating 70 is provided on the chemical conversion treatment layer 90. Specifically, FIG. 16 is an enlarged view of the pin contact surface 400 according to the present embodiment, that is different front FIG. 9, FIG. 11, FIG. 12 and FIG. 13. Referring to FIG. 16, the chemical conversion treatment layer 90 may be provided between the pin contact surface 400 and the resin coating 100, and further, the anti-rust resin coating 70 and the upper layer 60 of the resin coating 100 may be included in the resin coating 100.

Figure 17:
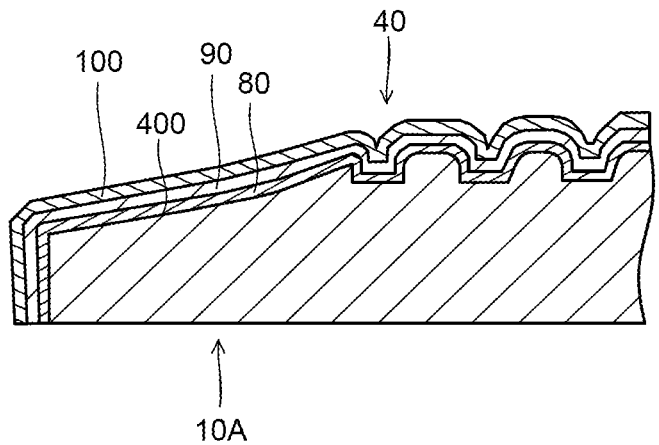
FIG. 17 is an enlarged view of a pin contact surface according to the present embodiment, that is different from FIG. 9, FIG. 11, FIG. 12, FIG. 13 and FIG. 16.

Further, the pin contact surface 400 and the box contact surface 500 according to the present embodiment may include both the plating layer 80 and the chemical conversion treatment layer 90. FIG. 17 is an enlarged view of the pin contact surface 400 according to the present embodiment, that is different from FIG. 9, FIG. 11, FIG. 12, FIG. 13 and FIG. 16. In FIG. 17, the plating layer 80 is provided on the pin contact surface 400, the chemical conversion treatment layer 90 is provided on the plating layer 80, the resin coating 100 is provided on the chemical conversion treatment layer 90. Therefore, in the case where the oil-well metal pipe 1 includes the plating layer 80, the oil-well metal pipe 1 includes the chemical conversion treatment layer 90 between the plating layer 80 and the resin coating 100.

In the oil-well metal pipe 1 according to the present embodiment, although the locations at which the plating layer 80 and the chemical conversion treatment layer 90 are provided are not limited to the example illustrated in FIG. 17, in a case where the plating layer 80 and the chemical conversion treatment layer 90 are provided between the pin contact surface 400 and the resin coating 100, the chemical conversion treatment layer 90 may be provided on the plating layer 80, and the resin coating 100 may be provided on the chemical conversion treatment layer 90. Further, in a case where the plating layer 80 is not provided between the pin contact surface 400 and the resin coating 100, the chemical conversion treatment layer 90 may be provided on the pin contact surface 400, and the resin coating 100 may be provided on the chemical conversion treatment layer 90. Similarly, in a case where the oil-well metal pipe 1 includes the plating layer 80 and the chemical conversion treatment layer 90 between the box contact surface 500 and the resin coating 100, the chemical conversion treatment layer 90 may be provided on the plating layer 80, and the resin coating 100 may be provided on the chemical conversion treatment layer 90. Further, in a case where the oil-well metal pipe 1 does not include the plating layer 80 between the box contact surface 500 and the resin coating 100, the chemical conversion treatment layer 90 may be provided on the box contact surface 500, and the resin coating 100 may be provided on the chemical conversion treatment layer 90.

Figure 18:
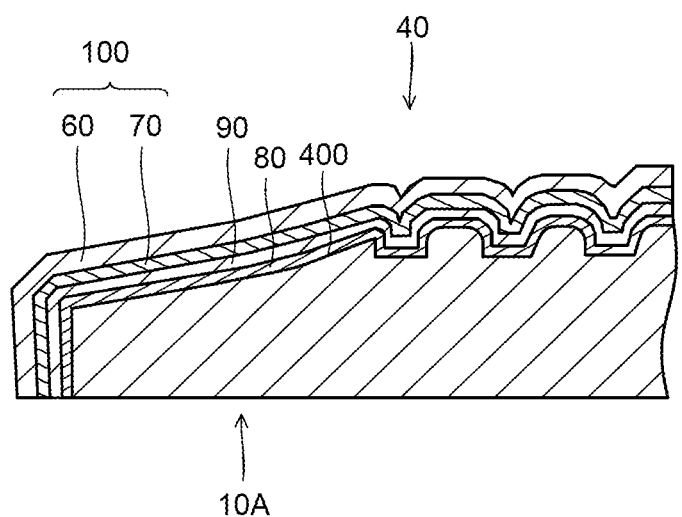
FIG. 18 is an enlarged view of a pin contact surface according to the present embodiment, that is different from FIG. 9, FIG. 11, FIG. 12, FIG. 13, FIG. 16 and FIG. 17.

In the present embodiment, in a case where the oil-well metal pipe 1 includes the plating layer 80 and the chemical conversion treatment layer 90, the anti-trust resin coating 70 is provided on the chemical conversion treatment layer 90. Specifically, FIG. 18 is an enlarged view of the pin contact surface 400 according to the present embodiment, that is different from FIG. 9, FIG. 11, FIG. 12, FIG. 13, FIG. 16 and FIG. 17. Referring to FIG. 18, the plating layer 80 may be provided on the pin contact surface 400, the chemical conversion treatment layer 90 may be provided on the plating layer 80, the resin coating 100 may be provided on the chemical conversion treatment layer 90, and further, the anti-rust resin coating 70 and the upper layer 60 of the resin coating 100 may be included in the resin coating 100.

In the present embodiment, the kind of the chemical conversion treatment layer 90 is not particularly limited. The chemical conversion treatment layer 90 is, for example, selected front the group consisting of a phosphate chemical conversion treatment layer, an oxalate chemical conversion treatment layer, a borate chemical conversion treatment layer and a chromate coating. From the viewpoint of the adhesiveness of the resin coating 100, a phosphate chemical conversion treatment layer is preferable. In this case, the phosphate is, for example, one or more types selected from the group consisting of manganese phosphate, zinc phosphate, manganese iron phosphate, and calcium zinc phosphate. The chemical conversion treatment layer 90 may be a chromate coating. The chromate coating may be formed by a well-known process. The chromate coating preferably does not contain hexavalent chromium.

In a case where the chemical conversion treatment layer 90 is provided on the pin contact surface 400 and/for the box contact surface 500 of the oil-well metal pipe 1 according to the present embodiment, the galling resistance of the oil-well metal pipe 1 increases further. The chemical conversion treatment layer 90 increases the adhesiveness of the resin coating 100 provided thereon by an anchor effect. By this means, the galling resistance of the oil-well metal pipe 1 increases. Referring to Example 3 that is described later, the number of sliding times until the coefficient of friction becomes more than 0.3 is higher for the oil-well metal pipe 1 that includes the chemical conversion treatment layer 90 than for the oil-well metal pipe 1 that does not include the chemical conversion treatment layer 90. Thus, in the oil-well metal pipe 1 in which the chemical conversion treatment layer 90 is provided on the pin contact surface 400 and/or the box contact surface 500, the galling resistance increases further.

It suffices that the oil-well metal pipe 1 of the present embodiment includes the resin coating 100 on at least one of the pin contact surface 400 and the box contact surface 500. Regarding the arrangement of the plating layer 80, the chemical conversion treatment layer 90 and the anti-rust resin coating 70, as described above, they may be arranged in the same manner on the pin contact surface 400 and the box contact surface 500, or may be arranged differently on the pin contact surface 400 and the box contact surface 500. The oil-well metal pipe 1 may, as necessary, also include other coatings.

Preconditioning Treatment

In the oil-well metal pipe 1 according to the present embodiment, at least one of the pin contact surface 400 and the box contact surface 500 may be a surface that is subjected to a preconditioning treatment. Therefore, in the present embodiment, a preconditioning treatment is an optional process, and both of the pin contact surface 400 and the box contact surface 500 may not be a surface that is subjected to a preconditioning treatment. If the preconditioning treatment is performed, the preconditioning treatment is, far example, one or more types selected from the group consisting of a blasting treatment and pickling. If a preconditioning treatment is performed, the surface roughness of the pin contact surface 400 and/or the box contact surface 500 increases. Therefore, the adhesiveness of the resin coating 100, the plating layer 80 and/or the chemical conversion treatment layer 90 formed thereon increases. As a result, the galling resistance of the oil-well metal pipe 1 increases.

Chemical Composition of Pipe Main Body

The pipe main body 10 of the oil-well metal pipe 1 according to the present embodiment is not particularly limited. The feature of the oil-well metal pipe 1 according to the present embodiment is the resin coating 100. Therefore, in the present embodiment, the kind of steel of the pipe main body 10 of the oil-well metal pipe 1 is not particularly limited.

The pipe main body 10 may be formed of, for example, carbon steel, stainless steel, alloy steel or the like. Accordingly, the oil-well metal pipe may be a steel pipe made of Fe-based alloy or an alloy pipe represented by a Ni-base alloy pipe. Here, the steel pipe is, for example, a low-alloy pipe, a martensitic stainless steel pipe, and a duplex stainless steel pipe. Meanwhile, among alloy steels, high alloy steels such as a Ni alloy and duplex stainless steels that contain alloying elements such as Cr, Ni and Mo have high corrosion resistance. Therefore by using these high alloy steels as the pipe main body 10, excellent corrosion resistance is obtained in a corrosive environment that contains hydrogen sulfide or carbon dioxide or the like.

Production Method

A method for producing the oil-well metal pipe 1 according to the present embodiment will be described hereunder.

The method for producing the oil-well metal pipe 1 according to the present embodiment includes a preparation process, an application process, and a hardening process. The hardening process is performed after the application process.

Preparation Process

In the preparation process, the oil-well metal pipe 1 having the pipe main both 10 that includes the pin 40 including the pin contact surface 400 that includes the external thread part 41, and the box 50 including the box contact surface 500 that includes the internal thread part 51 is prepared. As described above, the oil-well metal pipe 1 according to the present embodiment has a well-known structure. In other words, in the preparation process it suffices to prepare the oil-well metal pipe 1 that has a well-known structure.

Application Process

In the application process, a composition containing a resin, a solid lubricant powder and copper phthalocyanine is applied onto at least one of the pin contact surface 400 and the box contact surface 500. The composition is a composition for forming the aforementioned resin coaling 100. The composition contains a resin, a solid lubricant powder and copper phthalocyanine. The composition for forming the resin coating 100 is the same as the composition of the resin coating 100 described above, excluding a solvent.

The composition of a solventless type can be produced, for example, by heating the resin to a molten state, adding the solid lubricant powder and copper phthalocyanine thereto, and kneading them. The composition may be made of a powder mixture prepared by mixing all the components in powder form.

The composition of a solvent type can be produced, for example, by melting or dispersing the resin, the solid lubricant powder and copper phthalocyanine in a solvent and mixing them. The solvent is, for example, water, alcohol or an organic solvent. The solvent may contain a small amount of a surfactant. The proportion of the solvent is not particularly limited. It suffices to adjust the proportion of the solvent to an appropriate viscosity according to the application method. The proportion of the solvent is, for example, within a range of 40 to 60 mass % when taking the total of all components other than the solvent as 100 mass %.

The method of applying the composition on the pin contact surface 400 and/or the box contact surface 500 is not particularly limited, and a well-known method may be used. In the case of the composition of a solventless type, for example, the, composition can be applied on the pin contact surface 400 and/or the box contact surface 500 using a hot melt process. In the hot melt process, the composition is heated to melt the resin to place the composition in a fluid state with low viscosity. The composition in a fluid state can be sprayed from a spray gun having functions for temperature holding. Another application method, such as brushing or dipping may be employed as the method for applying the composition on the pin contact surface 400 and/or the box contact surface 500, instead of spray application. Note that, the temperature to which the composition is heated is preferably higher than the melting point of the resin by 10 to 50° C.

In the case of the solvent type composition, for example, the composition in solution form can be applied on the pin contact surface 400 and/or the box contact surface 500 by spray coating. In this case, the viscosity of the composition is to be adjusted so that it can be applied by spray coating in an environment at normal temperature and normal pressure. Another application method, such as brushing or dipping may be employed as the method for applying the composition on the pin contact surface 400 and/or the box contact surface 500, instead of spray application.

Hardening Process

In the hardening process, the applied composition is hardened to form the resin coating 100. In the case of the solventless type composition, by cooling the composition that was applied onto at least one of the pin contact surface 400 and the box contact surface 500, the composition in a molten state hardens and the solid resin coating 100 is formed. In this case, the cooling method is not particularly limited, and a well-known method may be used. Examples of the cooling method include allowing to cool in the atmosphere and air cooling. In the case of the solvent type composition, by drying the composition that was applied onto at least one of the pin contact surface 400 and the box contact surface 500, the composition hardens and the solid resin coating 100 is formed. In this case, the drying method is not particularly limited, and a well-known method may be used. The drying method is, for example, natural drying, low-temperature air drying or vacuum drying. Further, if the resin is a thermosetting resin, the solid resin coating 100 may be formed by causing the composition to harden by performing a thermal hardening process.

The oil-well metal pipe 1 according to e present embodiment is produced by the above processes, Optional Process The method for producing the oil-well metal pipe 1 according to the present embodiment may further include one or more processes of a plating layer formation process, a chemical conversion treatment process, an anti-rust resin coating formation process, and a preconditioning treatment process. All of these processes are optional processes. Therefore, these processes may not be performed.

Plating Layer Formation Process

The method for producing the oil-well metal pipe 1 according to the present embodiment may further include a plating layer formation process prior to the application process. In a case where the plating layer formation process is performed, the plating layer 80 is formed on at least one of the pin contact surface 400 and the box contact surface 500.

A method for forming the plating layer 80 is not particularly limited, and a well-known method may be used. Formation of the plating layer 80 may be performed by electroplating or may be performed by electroless plating. For example, in the case of forming a Zn—Ni alloy plating layer by electroplating, the plating bath contains zinc ions and nickel ions. The composition of the plating bath preferably contains zinc ions: 1, to 100 g/L and nickel ions: 1 to 50 g/L. The electroplating conditions are, for example, as follows: plating bath pH, 1 to 10, plating bath temperature: 20 to 60° C., current density: 1 to 100 A/dm$^2$, and treatment time: 0.1 to 50 mins. For example, when forming a Cu plating layer by electroplating, the Cu plating layer can be formed by a well-known method.

Chemical Conversion Treatment Process

The method for producing the oil-well metal pipe 1 according to the present embodiment may further include a chemical conversion treatment process prior to the application process. In a case where the chemical conversion treatment process is performed, the chemical conversion treatment layer 90 is formed on at least one of the pin contact surface 400 and the box contact surface 500.

The method of chemical conversion treatment is not particularly limited, and may be a well-known method. The chemical conversion treatment is, for example, selected from the group consisting of a phosphate chemical conversion treatment, an oxalate chemical conversion treatment, a borate chemical conversion treatment, and a chromate treatment. A common acidic solution for phosphate chemical conversion treatment for zinc-plated products can be used as the treatment solution for the chemical conversion treatment. As the treatment solution, for example, a solution for zinc phosphate chemical conversion treatment containing 1 to 150 g/L of phosphate ions, 3 to 70 g/L of zinc ions, 1 to 100 g/L of nitrate ions, and 0 to 30 g/L of nickel ions can be used. Solutions for manganese phosphate chemical conversion treatments which are conventionally used for the oil-well metal pipe 1 can also be used as the treatment solution. A commercially available chromate treatment solution can also be used as the treatment solution. The temperature of the treatment solution is normal temperature to 100° C., for example. The treatment time of the chemical conversion treatment can be appropriately set depending on the desired thickness of the coating and, for example, is 0.5 to 15 minutes. To promote the formation of the chemical conversion treatment layer 90, surface modification may be performed prior to the chemical conversion treatment. The term "surface modification" refers to a treatment that includes immersion in a surface modification aqueous solution containing colloidal titanium. In a case where the chemical conversion treatment process is performed, after performing the chemical conversion treatment it is preferable to perform rinsing with water or with warm water before drying.

Note that, as described above, in the oil-well metal pipe 1 according to the present embodiment, the chemical conversion treatment layer 90 is formed on either of the pin contact surface 400, the box contact surface 500, and the plating layer 80. That is, in the method for producing the oil-well metal pipe 1 according to the present embodiment, in the case of performing both the plating layer formation process and the chemical conversion treatment process, the chemical conversion treatment process is performed after the plating layer formation process, and thereafter the application process is performed.

Anti-Rust Resin Coating Formation Process

The method for producing the oil-well metal pipe 1 according to the present embodiment may further include an anti-rust resin coating formation process prior to the application process. In a case where the anti-rust resin coating formation process is performed, the anti-rust resin coating 70 is formed on at least one of the pin contact surface 400, the box contact surface 500, the plating layer 80 and the chemical conversion treatment layer 90.

A method for forming the anti-rust resin coating 70 is not particularly limited, and a well-known method may be used. The anti-rust resin coating 70 can be formed, for example, by applying a composition containing a rust preventive pigment and acrylic silicon resin onto at least one of the pin contact surface 400, the box contact surface 500, the plating layer 80 and the chemical conversion treatment layer 90, and causing the composition to harden. The application method is not particularly limited, and may be spray application, brushing or dipping. The composition for forming the anti-rust resin coating 70 may include a solvent. The composition for forming the anti-rust resin coating 70 is the same as the composition of the anti-rust resin coating 70 described above, excluding a solvent. The hardening method is, for example, natural drying, low-temperature air drying, or drying by heating.

Note that, as described above, in the oil-well metal pipe 1 according to the present embodiment, the anti-rust resin coating 70 is formed on either of the pin contact surface 400, the box contact surface 500, the plating layer 80, and the chemical conversion treatment layer 90. That is, in the method for producing the oil-well metal pipe 1 according to the present embodiment, in the case of performing each of the plating layer formation process, the chemical conversion treatment process and the anti-rust resin coating formation process, the plating layer formation process, the chemical conversion treatment process, and the anti-rust resin coating formation process are performed in that order, and thereafter the application process is performed.

Preconditioning Treatment Process

The method for producing the oil-well metal pipe 1 according to the present embodiment may further include a preconditioning treatment process prior to the application process. In a case where a plating layer formation process is to be performed, the method for producing the oil-well metal pipe 1 may include a preconditioning treatment process prior to the plating layer formation process. In a case where a chemical conversion treatment process is to be performed, the method for producing the oil-well metal pipe 1 may include a preconditioning treatment process prior to the chemical conversion treatment process. In a case where an anti-rust resin coating formation process is to be performed, the method for producing the oil-well metal pipe 1 may include a preconditioning treatment process prior to the anti-rust resin coating formation process. In the preconditioning treatment process, for example, a pickling treatment and/or a blasting treatment or the like is performed. In addition, an alkaline degreasing treatment may be performed.

In the case of performing a pickling treatment, for example, the pin contact surface 400 and/or the box contact surface 500 is immersed in a strongly acidic solution such as sulfuric acid, hydrochloric acid, nitric acid, hydrofluoric acid or a mixture of these acids, to thereby increase the surface roughness of the pin contact surface 400 and/or the box contact surface 500. In the case of performing a blasting treatment, for example, sand blasting is performed in which a blast material (an abrasive) is mixed with compressed air, and the mixture is propelled onto the pin contact surface 400 and/or the box contact surface 500. In this case, the surface roughness of the pin contact surface 400 and/or the box contact surface 500 increases.

Note that, with respect to the aforementioned plating layer formation process, chemical conversion treatment process, and preconditioning treatment process, the pin contact surface 400 and the box contact surface 500 may be subjected to the same processes or may be subjected to different processes to each other. Further, these processes may be performed only on the pin contact surface 400, or may be performed only on the box contact surface 500.

The oil-well metal pipe 1 according to the present embodiment is produced by the above processes. However, the production method described above is one example of a method for producing the oil-well metal pipe 1 according to the present embodiment, and the present embodiment is not limited to the production method described above. The oil-well metal pipe 1 according to the present embodiment may also be produced b another method.

Example 1

In Example 1, the resin coating 100 was formed on the pin contact surface 400 or the box contact surface 500 of the oil-well metal pipe 1, and high torque performance and galling resistance were evaluated. Specifically, in Example 1, an oil-well metal pipe with the trade name "VAM21 (registered trademark) HT" manufactured by NIPPON STEEL CORPORATION (external diameter: 273.05 mm (10.75 inches), wall thickness: 12.570 mm (0.495 inches)) was used. The steel grade of the oil-well metal pipe was SM2535-M110 steel (C≤0.03%, Si: ≤0.50%, Mn≤1.0%, Cu≤1.5%, No: 29.5 to 36.5%, Cr: 24.0 to 27.0%, balance: Fe and impurities).

For Test Numbers 1 to 12, a plating layer, an anti-rust resin coating was included in a resin coating were formed as appropriate on the box contact surface to prepare the oil-well metal pipes including a pin and a box of Test Numbers 1 to 12. The plating layers that were formed are shown in the "Plating Layer" column in Table 2. The symbol "-" in the "Plating Layer" column in Table 2 means that a plating layer was not thrilled. The thickness of each plating layer that was formed was 8 μm. The measurement of the thickness of the plating layer was performed by the method described above using an electromagnetic film thickness meter SDM-picoR manufactured by Sanko Electronic Laboratory Co., Ltd. Whether or not an anti-rust resin coating was formed is shown in the "Anti-Rust Resin Coating" column in Table 2. The term "formation" in the "Anti-Rust Resin Coating" column in Table 2 means that an anti-rust resin coating was formed. The symbol "-" in the "Anti-Rust Resin Coating" column in Table 2 means that an anti-rust resin coating was not formed. Note that, the anti-rust resin coating that was formed was the same as an anti-rust resin coating of Test Numbers 32 and 33 of Example 4 that is described later.

Whether or not a resin coating was formed is shown in the "Resin Coating" column in Table 2. The term "formation" in the "Resin Coating" column in Table 2 means that a resin coating was formed. The symbol "-" in the "Resin Coining" column in Table 2 means that a resin coating was not formed. Note that, in each of Test Numbers 1 to 9 and to 12, the thickness of each resin coating that was formed was 20 μm. In Test Number 10, the thickness of the resin coating was 20 μm except the thickness of an anti-rust resin coating. The measurement of the thickness of the resin coating was performed by the method described above using an electromagnetic film thickness meter SDM-picoR manufactured by Sanko Electronic Laboratory Co., Ltd. In each of Test Numbers 2 to 9 and to 12, the resin coating was formed on the surface of the aforementioned plating layer.

In Test Number 1, a plating layer was not formed. Therefore, in Test Number 1, the resin coating was formed directly on the box contact surface. In Test Number 10, the resin coating was formed on the anti-rust resin coating. Therefore, in Test Number 10, the resin coating included multiple layers. The content of copper phthalocyanine in the respective resin coatings that were formed is shown in Table 2. Note that, the resin coatings that were formed also contained 1 to 30 mass % of polytetrafluoroethylene (PTFE) as a solid lubricant powder, and the balance consisted of epoxy resin as a resin. The symbol "-" in the "Copper Phthalocyanine Content" column in Table 2 means that a resin coating was not formed, or that copper phthalocyanine was not contained in the resin coating that was formed. Note that, in Test Number 12, the formed resin coating did not contain copper phthalocyanine. In Test Number 12, the resin coating contained 8.6 mass % $Cr_2O_3$ instead of copper phthalocyanine. The resin coating of Test Number 12 also contained 1 to 30 mass % of polytetrafluoroethylene (PTFE) as a solid lubricant powder, and the balance consisted of epoxy resin as a resin.

TABLE 2

| Test Number | | Plating Layer | Anti-Rust Resin Coating | Resin Coating | Copper Phthalocyanine Content | High Torque Performance | M&B Count (Times) |
|---|---|---|---|---|---|---|---|
| 1 | Pin Contact Surface | — | — | — | — | 120 | — |
|   | Box Contact Surface | — | — | Formation | 10.0 mass % | | |
| 2 | Pin Contact Surface | — | — | — | — | 110 | 8 |
|   | Box Contact Surface | Zn—Ni Alloy Plating Layer | — | Formation | 0.1 mass % | | |
| 3 | Pin Contact Surface | — | — | — | — | 120 | 11 |
|   | Box Contact Surface | Zn—Ni Alloy Plating Layer | — | Formation | 0.2 mass % | | |
| 4 | Pin Contact Surface | — | — | — | — | 127 | 10 |
|   | Box Contact Surface | Zn—Ni Alloy Plating Layer | — | Formation | 0.4 mass % | | |
| 5 | Pin Contact Surface | — | — | — | — | 138 | 14 |
|   | Box Contact Surface | Zn—Ni Alloy Plating Layer | — | Formation | 1.0 mass % | | |

TABLE 2-continued

| Test Number | | Plating Layer | Anti-Rust Resin Coating | Resin Coating | Copper Phthalocyanine Content | High Torque Performance | M&B Count (Times) |
|---|---|---|---|---|---|---|---|
| 6 | Pin Contact Surface | — | — | — | — | 120 | 12 |
|   | Box Contact Surface | Zn—Ni Alloy Plating Layer | — | Formation | 4.0 mass % | | |
| 7 | Pin Contact Surface | — | — | — | — | 125 | 11 |
|   | Box Contact Surface | Zn—Ni Alloy Plating Layer | — | Formation | 10.0 mass % | | |
| 8 | Pin Contact Surface | — | — | — | — | 132 | 6 |
|   | Box Contact Surface | Zn—Ni Alloy Plating Layer | — | Formation | 20.0 mass % | | |
| 9 | Pin Contact Surface | — | — | — | — | 128 | 6 |
|   | Box Contact Surface | Zn—Ni Alloy Plating Layer | — | Formation | 30.0 mass % | | |
| 10 | Pin Contact Surface | — | — | — | — | 130 | — |
|   | Box Contact Surface | — | Formation | Formation | 10.0 mass % | | |
| 11 | Pin Contact Surface | — | — | — | — | 65 | 8 |
|   | Box Contact Surface | Zn—Ni Alloy Plating Layer | — | Formation | — | | |
| 12 | Pin Contact Surface | — | — | — | — | 90 | 10 |
|   | Box Contact Surface | Zn—Ni Alloy Plating Layer | — | Formation | — ($Cr_2O_3$: 8.6 mass %) | | |

Box Contact Surface

Plating Layer Formation Process

As shown in Table 2, a Zn—Ni alloy plating layer was formed h electroplating on the box contact surface of Test Numbers 2 to 9 and 11 to 12. The plating bath used was DAN Zinalloy N-PL (trademark) manufactured by Daiwa Fine Chemicals Co., Ltd. The thickness of the Zn—Ni alloy plating, layer was 8 μm. The measurement of the thickness of the plating layer was performed by the method described above using an electromagnetic film thickness meter SDM-picoR manufactured by Sanko Electronic Laboratory Co., Ltd. The electroplating conditions were as follows: plating bath pH: 6.5, plating bath temperature: 25° C., current density: 2 A/dm$^2$, and treatment time: 18 mins. The composition of the Zn—Ni alloy plating layer was Zn: 85% and Ni: 15%. In addition, a trivalent chromate coating was formed on the obtained Zn—Ni alloy plating layer. The treatment solution used for forming the trivalent chromate coating was DAIN Chromate TR-02 manufactured by Daiwa Fine Chemicals Co., Ltd. The conditions of the chemical conversion treatment were as follows: bath temperature: 25° C., pH: 4.0, and treatment time: 50 secs.

Application Process and Hardening Process

As shown in Table 2, a resin coating was formed on the box contact surface of Test Numbers 1 to 12. In Test Numbers 2 to 9, 11 and 12, the resin coating was formed on the box contact surface on which a plating layer was formed. In Test Number 1, the resin coating was formed directly on the box contact surface. In Test Number 10, the upper layer of the resin coating was formed on the anti-rust resin coating. A composition for forming the resin coating was applied by spraying onto the box contact surface, the Zn—Ni alloy plating layer, or the anti-rust resin coating, and caused to harden. As described above, the components other than a solvent contained in the composition were polytetrafluoroethylene particles and copper phthalocyanine, with the balance being epoxy resin. The composition also contained a solvent. A mixed solution of water, alcohol and a surfactant was used as the solvent. After applying the composition onto the Zn—Ni alloy plating layer of the box surface by spraying, a thermal hardening process was performed for 20 mins at 210° C. to form a resin coating. In Test Number 12, copper phthalocyanine was not used, and $Cr_2O_3$ in an amount of 8.6 mass % was used instead.

Pin Contact Surface

The pin contact surface of each of Test Numbers 1 to 12 was subjected to finishing by machine minding. That is, as shown in Table 2, a plating layer and a resin coating were not formed on the pin contact surface of Test Numbers 1 to 12.

High Torque Performance Evaluation

Figure 19:
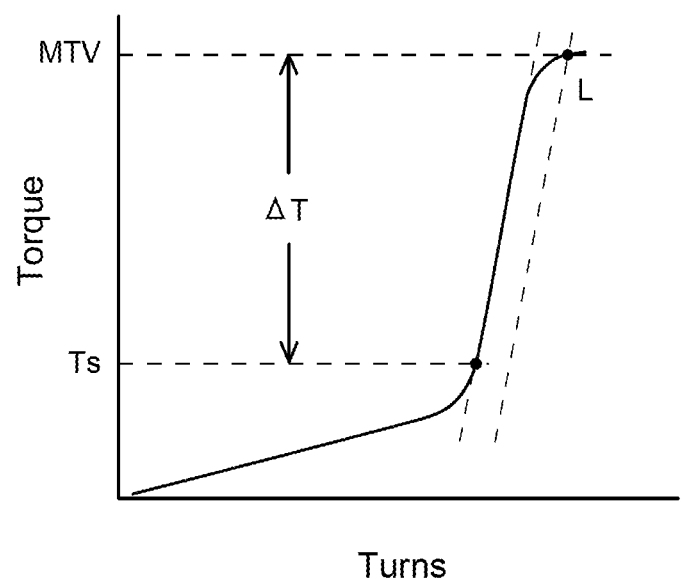
FIG. 19 is a view for describing a torque on shoulder resistance $\Delta T$ with respect to the examples.

Torque on shoulder resistance ΔT was measured using the oil-well metal pipe having a pin contact surface and a box contact surface of each of Test Numbers 1 to 12. Specifically, at a fastening speed of 10 rpm, the fastening torque value was gradually increased, and the test was ended at a point when the material yielded. The torque at the time of fastening was measured, and a torque chart as illustrated in FIG. 19 was prepared. Reference characters "Ts" in FIG. 19 denote the shouldering torque. Reference characters "MTV" in FIG. 19 denote a torque value at which a line segment L and the torque chart intersect. The line segment is a straight line that has the same slope as the slope of a linear region of the torque chart after shouldering, and for which the number of turns is 0.2% more in comparison to the aforementioned linear region. Normally, Ty (yield torque) is used when measuring the torque on shoulder resistance. However, in the present example, the yield torque Ty (boundary between a linear region and a non-linear region in the torque chart after shouldering) was indistinct. Therefore, MTV was defined using the line segment L. The difference between MTV and Ts was taken as the torque on shoulder resistance ΔT. The torque on shoulder resistance ΔT was determined as a relative value with respect to a torque on shoulder resistance ΔT in a case where a dope according to the API standards was used that was taken as a value of 100. The results are shown in the "High Torque Performance" column, in Table 2.

Repeated Fastening Test

A repeated fastening test using a fastening torque of 53800 Nm was performed using the oil-well metal pipe having a pin contact surface and a box contact surface of Test Numbers 1 to 12. Fastening was performed until either unrepairable galling occurred at a thread part (external thread part and/or internal thread part) or galling occurred at a metal seal portion. The results are shown in the "M&B Count (times)" column in Table 2. The symbol "-" in the "M&B Count (times)" column in Table 2 indicates that a repeated fastening test was not performed.

Evaluation Results

Referring to Table 2, the oil-well metal pipes of each of Test Numbers 1 to 10 included a resin coating containing a resin, a solid lubricant powder and copper phthalocyanine on at least one of the pin contact surface and the box contact surface. Therefore, the torque on shoulder resistance ΔT for each of Test Numbers 1 to 10 was 100 or more, indicating excellent high torque performance, In addition, in the oil-well metal pipes of Test Numbers 1 and 3 to 10, the content of copper phthalocyanine in the resin coating was 0.2 to 30.0 mass %. Therefore, the torque on shoulder resistance ΔT of the oil-well metal pipes of Test Numbers 1 and 3 to 10 was further increased in comparison to Test Number 2 in which the content of copper phthalocyanine was less than 0.2 mass %.

On the other hand, in the oil-well metal pipe of Test Number 11, although a resin coating containing a resin and a solid lubricant powder was formed on the box contact surface, the resin coating did not contain copper phthalocyanine. As a result, the torque on shoulder resistance ΔT was 65, and thus the high torque performance was low.

In the oil-well metal pipe of Test Number 12, although a resin coating containing is resin and a solid lubricant powder was formed on the box contact suffice, the resin coating did not contain copper phthalocyanine, and instead contained $Cr_2O_3$. As a result, the torque on shoulder resistance ΔT was 90, and thus the high torque performance was low.

Example 2

In Example 2, a resin coating was formed on the surface of steel plates simulating an oil-well metal pipe, and the galling resistance was evaluated. Specifically, in Example 2, cold-rolled steel plates (chemical composition: C≤0.15%, Mn≤0.60%, P≤0.100%, S≤0.050%, and the balance: Fe and impurities) were used.

Plating layers shown in Table 3 were formed as appropriate on the steel plate surfaces of Test Numbers 13 to 21. The plating layers that were formed are shown in the "Plating Layer" column in Table 3. The symbol "-" in the "Plating Layer" column in Table 3 means that a plating layer was not formed. The thickness of each plating layer that was formed was 8 μm. A resin coating was formed on the steel plate surfaces of Test Numbers 13 to 17 and 21. For Test Numbers 18 to 20, a resin coating was formed on the plating layer that was formed. The thickness of each resin coating that was formed was 20 μm. The measurement of the thickness of the resin coating was performed by the method described above using an electromagnetic film thickness meter SDM-picoR manufactured by Sanko Electronic Laboratory Co., Ltd., and the average value of the thicknesses at nine points on the same evaluation surface was taken as the thickness of the resin coating. In addition, the content of copper phthalocyanine in the resin coatings that were formed is shown in Table 3. Note that, the resin coatings that were formed also contained 1 to 30 mass % of polytetrafluoroethylene (PTFE) as a solid lubricant powder, and the balance consisted of epoxy resin as a resin. The symbol "-" in the "Copper Phthalocyanine Content" column in Table 3 means that copper phthalocyanine was not contained in the resin coating that was formed.

TABLE 3

| Test Number | Plating Layer | Copper Phthalocyanine Content | Number of Sliding Times until Coefficient of Friction Became More Than 0.3 (Times) |
|---|---|---|---|
| 13 | — | 0.1 mass % | 510 |
| 14 | — | 0.5 mass % | 647 |
| 15 | — | 2.0 mass % | 524 |
| 16 | — | 5.0 mass % | 531 |
| 17 | — | 10.0 mass % | 55 |
| 18 | Zn—Ni Alloy Plating Layer | 0.5 mass % | 743 |
| 19 | Zn—Ni Alloy Plating Layer | 2.0 mass % | 660 |
| 20 | Zn—Ni Alloy Plating Layer | 5.0 mass % | 609 |
| 21 | — | — | 511 |

Plating Layer Formation Process

A Zn—Ni alloy plating layer was formed by electroplating on the surface of the steel plate of each of Test Numbers 18 to 20. The plating bath used was DAIN Zinalloy N-PL (trademark) manufactured by Daiwa Fine Chemicals Co., Ltd. The thickness of the Zn—Ni alloy plating layer was 8 μm. The measurement of the thickness of the plating layer was performed by the method described above using an electromagnetic film thickness meter SDM-picoR manufactured by Sanko Electronic Laboratory Co., Ltd., and the average value of the thicknesses at nine points on the same evaluation surface was taken as the thickness of the plating layer. The electroplating conditions were as follows: plating bath pH: 6.5, plating bath temperature: 25° C., current density: 2 A/dm², and treatment time: 18 mins. The composition of the Zn—Ni alloy plating layer was Zn: 85% and Ni: 15%. In addition, a trivalent chromate coating was formed on the obtained Zn—Ni alloy plating layer. The treatment solution used for forming the trivalent chromate coating was DAIN Chromate TR-02 manufactured by Daiwa Fine Chemicals Co., Ltd. The conditions of the chemical conversion treatment were as follows: bath temperature: 25° C., pH: 4.0, and treatment time: 50 seconds.

Application Process and Hardening Process

A resin coating was formed on the surface of the steel plate of each of Test Numbers 13 to 21. Specifically, a composition for forming a resin coating was applied onto the surface of the steel plate of each of Test Numbers 13 to 21 using a bar coater, and caused to harden. The components other than a solvent contained in the composition were solid lubricant particles and copper phthalocyanine, with the balance being a resin. Epoxy resin was used as the resin in Test Numbers 13 to 21. Polytetrafluoroethylene particles were used as the solid lubricant particles in Test Numbers 13 to 21. The content of copper phthalocyanine was as shown in Table 3. The composition also contained a solvent. A mixed solution of water, alcohol and a surfactant was used as the solvent. In the case where there was a plating layer, the composition was applied with a bar corner onto the plating layer (or onto a chemical conversion treatment layer formed thereon), and in the case where there was no plating layer the composition was applied with a bar canter onto the steel plate surface, and thereafter a thermal hardening process was performed at 210° C. for 20 mins to form a resin coating.

Bowden Test

The Bowden test was carried out using the steel plates of Test Numbers 13 to 21 on which a resin coating was formed, and the galling resistance was evaluated. Specifically, a steel hall was caused to slide on the surface of the resin coating of Test Numbers 13 to 21, and the coefficient of friction was determined. The steel ball had a diameter of 3/16 inch, and had a chemical composition equivalent to SUJ2 defined in the JIS Standard. The load was set to 3 kgf (Hertz contact stress: average 1.56 GPa). The sliding width was set to 10 mm, and the sliding speed was set to 4 mm/sec. Sliding was performed without lubrication at room temperature. The coefficient of friction µ of the steel ball during sliding was measured, and the number of sliding times (number of round trips, that is, each time the steel ball slid back and forth once over a 10-mm area was counted as "one time") until the coefficient of friction µ became more than 0.3 (equivalent to the coefficient of friction between the resin coating and the steel ball) was measured. A Bowden type stick-slip tester manufactured by Shinko Engineering Co., Ltd, was used for the test. The results are shown in the "Number of Sliding Times until Coefficient of Friction Became More Than 0.3" column in Table 3.

Evaluation Results

Referring to Table 3, the steel plates of Test Numbers 13 to 20 included a resin coating containing a resin, a solid lubricant powder, and copper phthalocyanine on the surface. Referring further to Table 3, in the resin coating formed on the steel plate of each of Test Numbers 14 to 16 and 18 to 20, the content of copper phthalocyanine was within the range of 0.2 to 9.0 mass %. As a result, for the steel plates of Test Numbers 14 to 16 and 18 to 20, the number of sliding times until the coefficient of friction became more than 0.3 was high in comparison to the steel plate of Test Number 21 in which the resin coating did not contain copper phthalocyanine and the steel plates of Test Numbers 13 and 17 in which the content of copper phthalocyanine in the resin coating was outside the range of 0.2 to 9.0 mass %. That is, excellent galling resistance was exhibited.

Example 3

In Example 3, similarly to Example 2, a resin coating was formed on the surface of steel plates simulating an oil-well metal pipe, and the galling resistance was evaluated. Specifically m Example 3, cold-rolled steel plates (chemical composition: C≤0.15%, Mn≤0.60%, P≤0.100%, S≤0.050%, balance: Fe and impurities) were used.

Plating layers shown in Table 4 were formed as appropriate on the steel plate surfaces of Test Numbers 22 to 31. The plating layers that were formed are shown in the "Plating Layer" column in Table 4. The symbol "-" in the "Plating Layer" column in Table 4 means that a plating layer was not formed. The thickness of each plating layer that was formed was 8 µm. The measurement of the thickness of the plating layer was performed by the method described above using an electromagnetic film thickness meter SDM-picoR manufactured by Sanko Electronic Laboratory Co., Ltd., and the average value of the thicknesses at nine points on the same evaluation surface was taken as the thickness of the plating layer. A chemical conversion treatment layer was formed on the steel plate surface of Test Numbers 22 to 29 and 31. The chemical conversion treatment layer that was formed is shown in the "Chemical Conversion Treatment Layer" column in Table 4. The chemical conversion treatment solutions, treatment temperatures, and treatment times that were used for forming coatings A to D among the chemical conversion treatment layers in the "Chemical Conversion Treatment Layer" column are shown in Table 5. Note that, the term "trivalent chromate" in the "Chemical Conversion Treatment Layer" column in Table 4 means that a trivalent chromate coating was formed. The trivalent chromate coating is described later.

TABLE 4

| Test Number | Plating Layer | Chemical Conversion Treatment Layer | Copper Phthalocyanine Content | Sliding Distance until Coefficient of Friction Became More Than 0.6 (m) |
|---|---|---|---|---|
| 22 | — | Coating A | 0.5 mass % | 153.4 |
| 23 | — | Coating A | 2.0 mass % | 155.8 |
| 24 | — | Coating B | 0.5 mass % | 193.5 |
| 25 | — | Coating B | 2.0 mass % | 201.0 |
| 26 | — | Coating C | 0.5 mass % | 143.9 |
| 27 | — | Coating C | 2.0 mass % | 151.2 |
| 28 | — | Coating D | 0.5 mass % | 362.5 |
| 29 | — | Coating D | 2.0 mass % | 375.8 |
| 30 | Zn—Ni Alloy Plating Layer | — | 2.0 mass % | 108.8 |
| 31 | Zn—Ni Alloy Plating Layer | Trivalent chromate | 2.0 mass % | 121.5 |

TABLE 5

| | | Coating A | Coating B | Coating C | Coating D |
|---|---|---|---|---|---|
| Chemical Conversion Treatment Solution | System | Zinc Phosphate System | Zinc Phosphate System | Zinc Phosphate System | Manganese Phosphate System |
| | Free acidity | 7.5 pt/10 mL | 0.6 pt/5 ml | 1.9 pt/5 mL | 7.5 pt/10 ml |
| | Total acidity | 45.0 pt/10 mL | 22.0 pt/10 mL | 12.2 pt/5 mL | 24.4 pt/5 ml |
| Treatment Temperature | | 80° C. | 40° C. | 60° C. | 90° C. |
| Treatment Time | | 10 mins | 2 mins | 2 mins | 5 mins |

A resin coating was formed on the plating layer or on the chemical conversion treatment layer of Test Numbers 22 to 31. The thickness of each of the formed resin coatings was 20 μm. The measurement of the thickness of the resin coating was performed by the method described above using an electromagnetic film thickness meter SDM-picoR manufactured by Sanko Electronic Laboratory Co., Ltd., and the average value of the thicknesses at nine points on the same evaluation surface was taken as the thickness of the resin coating. Note that, the resin coatings that were formed contained a copper phthalocyanine content shown in Table 4, and also contained 1 to 30 mass % of polytetrafluoroethylene (PTFE) as a solid lubricant powder, and the balance consisted of epoxy resin as a resin.

Plating Layer Formation Process

A Zn—Ni alloy plating layer was formed by electroplating on the surface of the steel plate of each of Test Numbers 30 and 31. The plating bath used was DAIN Zinalloy N-PL (trademark) manufactured by Daiwa. Fine Chemicals Co., Ltd. The thickness of the Zn—Ni alloy plating, layer was 8 μm. The measurement of the thickness of the plating layer was performed by the method described above using an electromagnetic film thickness meter SDM-picoR manufactured by Sanko Electronic Laboratory Co., Ltd., and the average value of the thicknesses at nine points on the same evaluation surface was taken as the thickness at the plating layer. The electroplating conditions were as follows: plating bath pH: 6.5, plating bath temperature: 25° C., current density 2 A/dm$^2$, and treatment time: 18 mins. The composition of the Zn—Ni alloy plating layer was Zn: 85% and Ni: 15%.

Chemical Conversion Treatment Layer Formation Process

A chemical conversion treatment layer was formed on the surface of the steel plate or the plating layer of Test Numbers 22 to 29 and 31. Specifically, the chemical conversion treatment solutions listed in Table 5 were used as the chemical conversion treatment solutions for coatings A to D. The treatment solution used for forming a trivalent chromate coating was DAM Chromate TR-02 manufactured by Daiwa Fine Chemicals Co., Ltd. The conditions of the chemical conversion treatment for coatings A to D were as described in Table 5. The conditions of the chemical conversion treatment for forming the trivalent chromate coating were: bath temperature: 25° C., pH: 4.0, and treatment time: 50 seconds.

Application Process and Hardening Process

A resin coating was formed on the surface of the plating layer or the chemical conversion treatment layer of Test Numbers 22 to 31. Specifically, a composition for forming a resin coating was applied onto the surface of the plating layer or the chemical conversion treatment layer of Test Numbers 22 to 31 using a bar coater, and caused to harden. The components other than a solvent contained in the composition were solid lubricant particles and copper phthalocyanine, with the balance being a resin. Epoxy resin was used as the resin in Test Numbers 22 to 31. Polytetrafluoroethylene particles were used as the solid lubricant particles in Test Numbers 22 to 31. The content of copper phthalocyanine was as shown in Table 4. The composition also contained a solvent. A mixed solution of water, alcohol and a surfactant was used as the solvent. In the case where there was a chemical conversion treatment layer, the composition was applied with a bar coater onto the chemical conversion treatment layer, and in the case where there was no chemical conversion treatment layer the composition was applied with a bar coater onto the plating layer, and thereafter a thermal hardening process was performed at 210° C. for 20 mins to form a resin coating.

Pin-On-Disk Test

The galling resistance was evaluated by means of a pin-on-disk type sliding test machine using the steel plates of Test Nos. 22 to 31 on which a resin coating was formed. Specifically, the steel plate of each of Test Nos. 22 to 31 was affixed onto a rotary disk, and the rotary disk was rotated at 100 rpm while a steel ball remained pressed against the rotary disk with a force of 60 N. The rotation direction of the rotary disk was set to one direction only. Note that, by rotating the rotary disk, sliding of the steel ball with respect to the resin coating was performed without lubrication at room temperature. A coefficient of friction μ of the steel ball during sliding was measured, and the sliding distance (m) until the coefficient of friction μ became more than 0.6 (equivalent to the coefficient of friction between the resin coating and the steel ball) was measured. The results are shown in the "Sliding Distance until Coefficient of Friction Became More Than 0.6" column in Table 4.

Evaluation Results

Referring to Table 4, the steel plates of Test Numbers 22 to 31 included a resin coating containing a resin, a solid lubricant powder, and copper phthalocyanine on the surface. Referring further to Table 4, in the resin coating formed on the steel plates of Test Numbers 22 to 31, the content of copper phthalocyanine was 0.2 to 9.0 mass %. As a result, the sliding distance until the coefficient of friction became more than 0.6 was long. That is, excellent galling resistance was exhibited.

The steel plates of Test Numbers 22 to 29 and 31 included a chemical conversion treatment layer as an underlayer of the resin coating. As a result, in comparison to the steel plate of Test Number 30 that did not include a chemical conversion treatment layer as an underlayer of the resin coating, the sliding distance until the coefficient of friction became more than 0.6 was even longer. That is, more excellent galling resistance was exhibited.

The steel plates of Test Numbers 22 to 29 included coatings A to D as a chemical conversion treatment layer. As a result, in comparison to the steel plate of Test Number 31 that included a trivalent chromate coating as a chemical conversion treatment layer, the sliding distance until the coefficient of friction became more than 0.6 was even longer. That is, more excellent galling resistance was exhibited.

Example 4

In Example 4, a resin coating was formed on the surface of steel plates simulating an oil-well metal pipe, and the galling resistance was evaluated. Specifically, in Example 4, cold-rolled steel plates (chemical composition: C≤0.15%, Mn≤0.60%, P≤0.100%, S≤0.050%, balance: Fe and impurities) were used.

An anti-rust resin coating including a resin coating, or a resin coating as shown in Table 6 were formed on the steel plate surfaces of Test Numbers 32 to 34. The term "formation" in the "Anti-Rust Resin Coating" column in Table 6 indicates that an anti-rust resin coating was formed on the steel plate surface. The symbol "-" in the "Anti-Rust Resin Coating" column in Table 6 indicates that an anti-rust resin coating was not formed on the steel plate surface.

TABLE 6

| Test Number | Anti-Rust Resin Coating | Copper Phthalocyanine Content | Rust Development Time Period (h) |
|---|---|---|---|
| 32 | Formation | 0.5 mass % | 1006< |
| 33 | Formation | 2.0 mass % | 1006< |
| 34 | — | 2.0 mass % | 768 |

Anti-Rust Resin Coating Formation Process

An anti-rust resin coating was formed on the surface of the steel plate of Test Numbers 32 and 33. The composition for forming the anti-rust resin coating contained rust preventive pigment in an amount of 8 mass %, and acrylic silicon resin in an amount of 70 mass %. The composition for forming the anti-rust resin coating also contained a solvent. The composition for forming the anti-rust resin coating was applied to the surface of the steel plate of Test Numbers 32 and 33 by spraying, and was allowed to harden by natural drying. The thickness of the anti-rust resin coating of Test Number 32 was 13 μm. The thickness of the anti-rust resin coating of Test Number 33 was 11 μm. The measurement of the thickness of the anti-rust resin coating was performed by the method described above using an electromagnetic film thickness meter SOM-picoR manufactured by Sanko Electronic Laboratory Co., Ltd., and the average value of the thicknesses at nine points on the same evaluation surface was taken as the thickness of the anti-rust resin coating.

Application Process and Hardening Process

An upper layer of the resin coating was formed on the surface of the anti-rust resin coating of Test Numbers 32 and 33. A resin coating was formed on the surface of the steel plate of Test Number 34. Specifically, a composition for forming a resin coating was applied onto the surface of the steel plate or onto the surface of the anti-rust resin coating of Test Numbers 32 to 34 using a bar coater, and caused to harden. The components other than a solvent contained in the composition were solid lubricant particles and copper phthalocyanine, with the balance being a resin. Epoxy resin was used as the resin. Polytetrafluoroethylene particles were used as the solid lubricant particles. The content of copper phthalocyanine was as shown in Table 6. The composition also contained a solvent. A mixed solution of water, alcohol and a surfactant was used as the solvent. In the case where there was an anti-rust resin coating, the composition was applied with a bar coater onto the anti-rust resin coating, and in the case where there was no anti-rust resin coating the composition was applied with a bar coiner onto the surface of the steel plate, and thereafter a thermal hardening process was performed at 210° C. for 20 mins to form a resin coating. The resin coatings that were formed also contained 1 to 30 mass % of polytetrafluoroethylene (PTFE) as a solid lubricant powder, and the balance consisted of epoxy resin as a resin.

The thickness of the resin coating of Test Number 32 was 35.5 μm, the thickness of the resin coating of Test Number 33 was 33.0 μm, and the thickness of the resin coating of Test Number 34 was 26.8 μm. Note that, the resin coating of Test Numbers 32 and 33 included the anti-rust resin coating. Therefore, the thickness of the upper layer of the resin coating of Test Numbers 3.2 was 2.2.5 μm and the thickness of the upper layer of the resin coating of Test Numbers 33 was 22.0 μm. The measurement of the thickness of the resin coating was performed by the method described above using an electromagnetic film thickness meter SDM-picoR manufactured by Simko Electronic Laboratory Co., Ltd., and the average value of the thicknesses at nine points on the same evaluation surface was taken as the thickness of the resin coating.

Salt Spray Test

A salt spray test (SST) was carried out using the steel plates of Test Numbers 32 to 34 on which a resin coating was formed. A test instrument with the trade name "Combined Cyclic Corrosion Test instrument CY90" manufactured by Suga Test Instruments Co., Ltd., was used for the salt spray test. The salt spray test conformed to JIS Z 2371 (2015). The test conditions were as follows: NaCl concentration of spray: 5±0.5%, spray amount: 1.5±0.5 mL/h/80 cm², temperature: 35±2° C., pH during test: 6.5 to 7.2. In the present example, the time period until blistering of the resin coating occurred was taken as a rust development time period. The rust development time periods are shown in Table 6.

Evaluation Results

Referring to Table 6, the steel plates of Test Numbers 32 to 34 included a resin coating containing a resin, a solid lubricant powder, and copper phthalocyanine on the surface.

The steel plates of Test Numbers 32 and 33 included an anti-rust resin coating in the resin coating. As a result, the time period until rust developed was longer in comparison to the steel plate of Test Number 34 that did not include an anti-rust resin coating m the resin coating. That is, excellent corrosion resistance was exhibited.

An embodiment of the present disclosure has been described above. However, the foregoing embodiment is merely an example for implementing the present disclosure. Accordingly, the present disclosure is not limited to the above embodiment, and the above embodiment can be appropriately modified within a range which does not deviate from the gist of the present disclosure.

REFERENCE SIGNS LIST

1 Oil-well metal pipe
10 Pipe Main Body
10A First End Portion
10B Second End Portion
11 Pin Tube Body
12 Coupling
40 Pin
41 External Thread Pan
42 Pin Sealing Surface
43 Pin Shoulder Surface
50 Box
51 Internal Thread Part
52 Box Sealing Surface
53 Box Shoulder Surface
70 Anti-Rust Resin Coating
80 Plating Layer
90 Chemical Conversion Treatment Layer 100 Resin Coating,
400 Pin Contact Surface
500 Box Contact Surface

The invention claimed is:

1. An oil-well metal pipe, comprising:
a pipe main body including a first end portion and a second end portion;
wherein:
the pipe main body includes:
a pin formed at the first end portion, and
a box formed at the second end portion;
the pin includes:
a pin contact surface including an external thread part;
the box includes:
a box contact surface including an internal thread part;
the oil-well metal pipe further comprising:
a resin coating containing a resin, a solid lubricant powder and copper phthalocyanine on or above at least one of the pin contact surface and the box contact surface.

2. The oil-well metal pipe according to claim 1, wherein:
the resin coating contains 0.2 to 30.0 mass % of copper phthalocyanine.

3. The oil-well metal pipe according to claim 2, wherein:
the resin coating contains:
0.2 to 30.0 mass % of copper phthalocyanine,
60 to 90 mass % of the resin, and
1 to 30 mass % of the solid lubricant powder.

4. The oil-well metal pipe according to claim 2, wherein:
the resin coating contains 0.2 to 9.0 mass % of copper phthalocyanine.

5. The oil-well metal pipe according to claim 1, further comprising:
a plating layer between at least one of the pin contact surface and the box contact surface, and the resin coating.

6. The oil-well metal pipe according to claim 1, further comprising:
a chemical conversion treatment layer between at least one of the pin contact surface and the box contact surface, and the resin coating.

7. The oil-well metal pipe according to claim 5, further comprising:
a chemical conversion treatment layer between the plating layer and the resin coating.

8. The oil-well metal pipe according to claim 1, wherein:
the resin coating further containing a rust preventive pigment.

9. The oil-well metal pipe according to claim 1, wherein:
at least one of the pin contact surface and the box contact surface is a surface that is subjected to one or more types of treatment selected from the group consisting of a blasting treatment and pickling.

10. The oil-well metal pipe according to claim 1, wherein:
the resin is one or more types selected from the group consisting of epoxy resin, phenol resin, acrylic resin, urethane resin, polyester resin, polyamide-imide resin, polyamide resin, polyimide resin and polyether ether ketone resin.

11. The oil-well metal pipe according to claim 1, wherein:
the solid lubricant powder is one or more types selected from the group consisting of graphite, zinc oxide, boron nitride, talc, molybdenum disulfide, tungsten disulfide, graphite fluoride, tin sulfide, bismuth sulfide, organic molybdenum, thiosulfate compounds, and polytetrafluoroethylene.

12. The oil-well metal pipe according to claim 1, wherein:
the pin contact surface further includes a pin sealing surface and a pin shoulder surface, and
the box contact surface further includes a box sealing surface and a box shoulder surface.

13. A method for producing the oil-well metal pipe according to claim 1, the method comprising the steps of:
preparing an oil-well metal pipe comprising a pipe main body that includes a pin including a pin contact surface that includes an external thread part, and a box including a box contact surface that includes an internal thread part;
applying a composition containing a resin, a solid lubricant powder and copper phthalocyanine onto at least one of the pin contact surface and the box contact surface; and
hardening the composition that is applied to form a resin coating.

* * * * *